(12) United States Patent
Kropaczek et al.

(10) Patent No.: US 7,424,412 B2
(45) Date of Patent: *Sep. 9, 2008

(54) METHOD OF DETERMINING NUCLEAR REACTOR CORE DESIGN WITH REDUCED CONTROL BLADE DENSITY

(75) Inventors: David Joseph Kropaczek, Wilmington, NC (US); Mehdi Asgari, Wilmington, NC (US); Richard Dean McCord, Wilmington, NC (US)

(73) Assignee: Global Nuclear Fuel - Americas, LLC, Wilmington, NC (US)

( * ) Notice: Subject to any disclaimer, the term of this patent is extended or adjusted under 35 U.S.C. 154(b) by 458 days.

This patent is subject to a terminal disclaimer.

(21) Appl. No.: 11/024,974

(22) Filed: Dec. 30, 2004

(65) Prior Publication Data
US 2005/0222833 A1 Oct. 6, 2005

Related U.S. Application Data

(63) Continuation-in-part of application No. 10/325,831, filed on Dec. 23, 2002, now Pat. No. 7,200,541.

(51) Int. Cl.
*G06F 9/455* (2006.01)

(52) U.S. Cl. .......................... 703/6; 376/353; 376/411; 376/381; 376/256; 706/11

(58) Field of Classification Search .............. 703/1, 703/6, 2, 14, 13; 376/267, 434, 245, 353, 376/411, 381, 435, 122, 237, 254, 283, 259, 376/256; 706/11, 46; 717/141; 714/38; 434/218; 345/473
See application file for complete search history.

(56) References Cited

U.S. PATENT DOCUMENTS

| | | | | |
|---|---|---|---|---|
| 4,851,186 A | * | 7/1989 | Berte et al. | 376/364 |
| 5,272,736 A | * | 12/1993 | Wolters et al. | 376/267 |
| 5,519,746 A | * | 5/1996 | Dalke et al. | 376/434 |
| 5,677,938 A | * | 10/1997 | Gassmann | 376/237 |
| 5,790,618 A | * | 8/1998 | Fawks, Jr. | 376/259 |
| 5,923,717 A | * | 7/1999 | Fawks, Jr. | 376/245 |
| 6,026,136 A | * | 2/2000 | Radkowsky | 376/173 |
| 6,208,982 B1 | * | 3/2001 | Allen et al. | 706/11 |
| 6,243,860 B1 | * | 6/2001 | Holland | 717/141 |
| 6,259,756 B1 | * | 7/2001 | Reese et al. | 376/237 |
| 6,263,038 B1 | * | 7/2001 | Kantrowitz et al. | 376/435 |
| 6,338,149 B1 | * | 1/2002 | Ciccone et al. | 714/38 |

(Continued)

*Primary Examiner*—Paul L Rodriguez
*Assistant Examiner*—Kandasamy Thangavelu
(74) *Attorney, Agent, or Firm*—Harness, Dickey & Pierce, P.L.C.

(57) ABSTRACT

In the method, a reference core design is generated based on a defined set of limits. The set of limits may include a target hot excess reactivity constraint to be satisfied over a given core energy cycle and a given desired control blade definition that is set for the cycle. A reference core design is generated based on the defined limits. A unique subset of fresh fuel bundles is subject to an iterative improvement process including replacing, at each fuel location, at least one of the current fresh fuel bundles with at least one of the selected fresh fuel bundles, and simulating reactor operation on the reference core design to obtain a plurality of outputs to be ranked based on the defined set of limits. The highest ranked output may represent an accepted core design with set control blade definition that satisfies the target hot excess reactivity constraint.

18 Claims, 19 Drawing Sheets

U.S. PATENT DOCUMENTS

| | | | |
|---|---|---|---|
| 6,404,437 B1* | 6/2002 | Russell et al. | 345/473 |
| 6,430,247 B1* | 8/2002 | Mourlevat et al. | 376/254 |
| 6,526,116 B1* | 2/2003 | Nguyen et al. | 376/439 |
| 6,697,447 B1* | 2/2004 | Casillas et al. | 376/245 |
| 6,701,289 B1* | 3/2004 | Garnett et al. | 703/14 |
| 6,748,348 B1* | 6/2004 | Russell, II | 703/6 |
| 6,934,350 B1* | 8/2005 | Challberg et al. | 376/353 |
| 7,200,541 B2* | 4/2007 | Kropaczek et al. | 703/13 |
| 2002/0085660 A1* | 7/2002 | Nakamaru et al. | 376/283 |
| 2002/0101949 A1* | 8/2002 | Nordberg | 376/122 |
| 2002/0101951 A1* | 8/2002 | Nakamaru et al. | 376/282 |
| 2003/0086520 A1* | 5/2003 | Russell et al. | 376/259 |
| 2004/0013220 A1* | 1/2004 | Casillas et al. | 376/245 |
| 2004/0052326 A1* | 3/2004 | Blanpain et al. | 376/411 |
| 2004/0059549 A1* | 3/2004 | Kropaczek et al. | 703/2 |
| 2004/0059696 A1* | 3/2004 | Kropaczek et al. | 706/46 |
| 2004/0066875 A1* | 4/2004 | Bazant | 376/381 |
| 2004/0096101 A1* | 5/2004 | Mori et al. | 382/162 |
| 2004/0101083 A1* | 5/2004 | Russell et al. | 376/256 |
| 2004/0122629 A1* | 6/2004 | Russell et al. | 703/2 |
| 2004/0122632 A1* | 6/2004 | Kropaczek et al. | 703/2 |
| 2004/0191734 A1* | 9/2004 | Russell et al. | 434/218 |
| 2004/0220787 A1* | 11/2004 | Russell et al. | 703/6 |
| 2005/0015227 A1* | 1/2005 | Kropaczek et al. | 703/6 |
| 2005/0018806 A1* | 1/2005 | Gautier et al. | 376/406 |
| 2006/0149514 A1* | 7/2006 | Kropaczek et al. | 703/6 |

* cited by examiner

FIG. 5

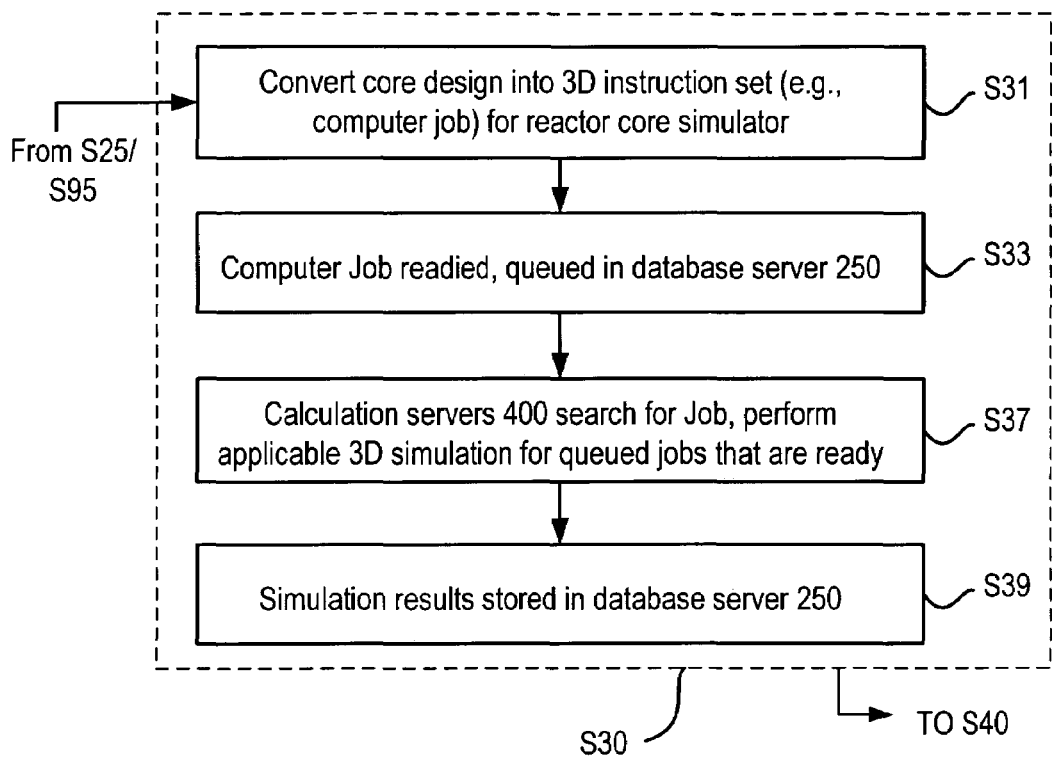

- S31: Convert core design into 3D instruction set (e.g., computer job) for reactor core simulator
- From S25/S95
- S33: Computer Job readied, queued in database server 250
- S37: Calculation servers 400 search for Job, perform applicable 3D simulation for queued jobs that are ready
- S39: Simulation results stored in database server 250
- S30
- TO S40

FIG. 6

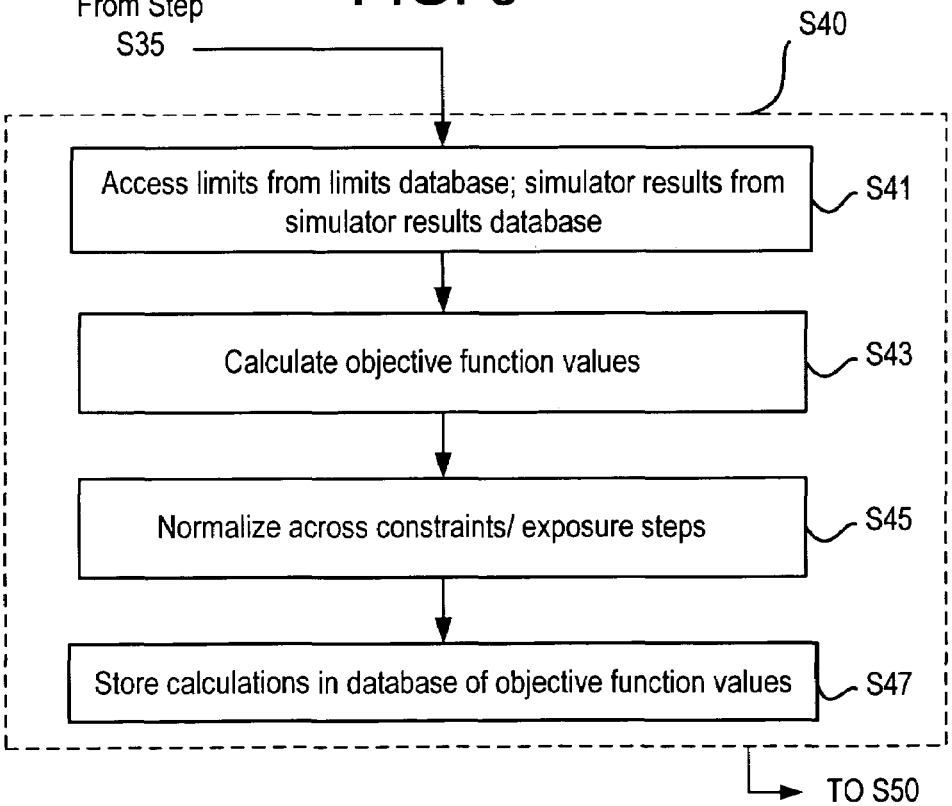

From Step S35

S40
- S41: Access limits from limits database; simulator results from simulator results database
- S43: Calculate objective function values
- S45: Normalize across constraints/ exposure steps
- S47: Store calculations in database of objective function values

| Constraint Description | Importance | Exposure Dependence | Design Value | Objective Add Funct. | Optimization Credits |
|---|---|---|---|---|---|
| Maximum MFLCPR | Nominal | ☐ Edit | 0.964 | ☐ | None |
| Maximum MFLPD | Nominal | ☐ Edit | 0.957 | ☐ | None |
| Maximum MAPLHGR — 815 | Nominal | ☐ Edit | 0.957 | ☐ | None |
| Minimum % Flow — 820 | High | ☐ Edit | 85.0 | ☐ | None |
| Maximum % Flow | High | ☐ Edit | 100.0 | ☐ | None |
| Eigenvalue Upper Tolerance (Δ Cycle) | None | ☐ Edit | 1.0E-4 | ☐ | None |
| Eigenvalue Lower Tolerance (Δ Cycle) | None | ☐ Edit | 1.0E-4 | ☐ | None |
| EOC Eigenvalue Upper Tolerance | None | | 0.0 | ☐ | None |
| EOC Eigenvalue Lower Tolerance | Nominal | | 0.0 | ☐ | Nominal |
| Minimum Cycle Length (MWD/st) | None | | 11500.0 | ☐ | None |
| Maximum Nodal Exposure Ratio (NEXRAT) | None | | 0.0 | ☐ | None |
| Maximum Bundle Average Exposure @ EOC | None | | 0.0 | ☐ | None |
| Minimum % Shutdown Margin — 825 | Nominal | ☐ Edit | 1.5 | ☐ | None |
| Maximum % Hot Excess | Extreme | ☐ Edit | 1.0 | ☐ | None |
| Minimum % SLICS Margin — 830 | None | ☐ Edit | 0.0 | ☐ | None |
| Minimum % Hot Excess | Extreme | ☒ Edit | 0.8 | ☐ | None |
| Maximum Hot Excess Slope (%/(MWD/st)) | None | | 0.0 | ☐ | None |
| Minimum Average Void Fraction | None | ☐ Edit | 0.0 | ☐ | None |
| Maximum Average Void Fraction | None | ☐ Edit | 0.0 | ☐ | None |
| Minimum Axial Void Tilt (AVT) | None | ☐ Edit | 0.0 | ☐ | None |
| Maximum Axial Void Tilt (AVT) | None | ☐ Edit | 0.0 | ☐ | None |
| Minimum Axial Power Tilt (APT) | None | ☐ Edit | 0.0 | ☐ | None |
| Maximum Axial Power Tilt (APT) | None | ☐ Edit | 0.0 | ☐ | None |
| Minimum Axial Peak | None | ☐ Edit | 0.0 | ☐ | None |
| Maximum Axial Peak | None | ☐ Edit | 0.0 | ☐ | None |
| Maximum Integrated Power | None | ☐ Edit | 0.0 | ☐ | None |

FIG. 10

| ePrometheus - Browns Ferry 2 - Cycle 11 - Version 1.0 Official Test Case (Do Not Modify) (Response Surface 1 Iteration 1) - CS ID: 846 | | | | |
|---|---|---|---|---|
| WorkSpace Input Run View Reports Window Help | | | | |
| Summary | | | | |
| Max MFLPD | 0.938 | Max MAPLHGR | 0.906 | |
| Max MFLCPR | 0.932 | Max CSDM (%) | 1.553 | |
| Max Flow (%) | 99.86 | Min Flow (%) | 85.26 | |
| Max Eigenvalue Δ | 1.0E-4 | Min Eigenvalue Δ | -1.0E-4 | |
| EOCk | 1.00129 | Cycle Length (MWD/st) | 14500.0 | |
| Objective Function | 0.2190122 | | | |

| Constraint | Violated | Contribution | % Contribution |
|---|---|---|---|
| ☐ Minimum Cycle Length | No | 0.0 | 0.00 |
| ☐ Maximum Average MAPLHGR | No | 0.0 | 0.00 |
| ☐ Maximum Average MFLPD | No | 0.0 | 0.00 |
| ☐ Maximum Average MFLCPR | No | 0.0 | 0.00 |
| ☐ Maximum Hot Excess Slope | No | 0.0 | 0.00 |
| ☐ Minimum Hot Excess @ 200 | No | 0.0 | 0.00 |
| ☐ EOC Eigenvalue Upper Tolerance | No | 0.0 | 0.00 |
| ☑ EOC Eigenvalue Lower Tolerance | Yes | 0.17135143 | 78.24 |
| ☐ Eigenvalue Upper Tolerance (Δ Cycle) | No | 0.0 | 0.00 |
| ☐ Eigenvalue Lower Tolerance (Δ Cycle) | No | 0.0 | 0.00 |
| ☐ Minimum % Flow | No | 0.0 | 0.00 |
| ☐ Maximum % Flow | No | 0.0 | 0.00 |
| ☐ Maximum % Hot Excess | No | 0.0 | 0.00 |
| ☐ Minimum % SLICS Margin | No | 0.0 | 0.00 |
| ☐ Minimum Average Void Fraction | No | 0.0 | 0.00 |
| ☐ Maximum Average Void Fraction | No | 0.0 | 0.00 |
| ☐ Minimum Axial Void Tilt (AVT) | No | 0.0 | 0.00 |
| ☐ Maximum Axial Void Tilt (AVT) | No | 0.0 | 0.00 |
| ☐ Minimum Axial Power Tilt (APT) | No | 0.0 | 0.00 |
| ☐ Maximum Axial Power Tilt (APT) | No | 0.0 | 0.00 |
| ☐ Minimum Axial Peak | No | 0.0 | 0.00 |
| ☐ Maximum Axial Peak | No | 0.0 | 0.00 |
| ☐ Minimum % Shutdown Margin | No | 0.0 | 0.00 |
| ☐ Maximum Integrated Power | No | 0.0 | 0.00 |
| ☑ Maximum MFLCPR | Yes | 0.006201509 | 2.83 |
| ☐ Maximum MAPLHGR | No | 0.0 | 0.00 |
| ☑ Maximum MFLPD | Yes | 0.04145926 | 18.93 |
| ☐ Maximum Peak Nodal Exposure (NEXRAT) | No | 0.0 | 0.00 |
| ☐ Maximum Bundle Average Exposure @ EOC | No | 0.0 | 0.00 |
| ☐ Number of Pin Types | No | 0.0 | 0.00 |
| ☐ U235 Efficiency | No | 0.0 | 0.00 |

Graph Selected | Select All | Deselect All

METHOD OF DETERMINING NUCLEAR REACTOR CORE DESIGN WITH REDUCED CONTROL BLADE DENSITY

CROSS-REFERENCE TO RELATED CASES

This application is a continuation-in-part of, and claims domestic priority benefits under 35 U.S.C. §120 to, co-pending U.S. patent application Ser. No. 10/325,831 to David J. Kropaczek et al., filed Dec. 23, 2002 and entitled "Method and Arrangement for Determining Nuclear Reactor Core Designs", now U.S. Pat. No.7,200,541 B2.

BACKGROUND OF THE INVENTION

1. Field of the Invention

This invention relates generally to determining a reactor core design for a nuclear reactor which has a desired minimum control blade definition.

2. Description of Related Art

A core of a light-water power nuclear reactor (LWR) such as boiling water reactor (BWR) or pressurized water reactor (PWR) has several hundred individual fuel bundles (fuel assemblies) of fuel rods (BWR) or groups of fuel rods (PWR) that have different characteristics. These bundles (fuel rod groups) are preferably arranged so that interaction between rods within a fuel bundle (rod group), and between fuel bundles (fuel rod groups) satisfies all regulatory and reactor design constraints, including governmental and customer-specified constraints. Additionally, the core design must be determined so as to optimize core cycle energy. Core cycle energy is the amount of energy that a reactor core generates before the core needs to be reloaded with new fuel elements, such as is done at an outage. A core energy cycle (or fuel cycle) in a power reactor such as a BWR may typically extend 12 months, 18 months, 2 years or more before the reactor is shutdown at a planned maintenance outage for replacement of fresh fuel bundles and shifting of exposed fuel bundles (burnt, twice-burnt, etc.) to In the case of a BWR, for example, the number of potential bundle arrangements within the core and individual fuel element arrangements within a bundle may be in excess of several hundred factorial. From these many different possible configurations, only a small percentage of core designs may satisfy all applicable design constraints. Further, only a small percentage of these core designs, which do satisfy all applicable design constraints, are economical.

In addition to determining the fresh fuel arrangement of the core design, control blade operational strategy should be evaluated in the design process. Conventional control blade operational strategy involves determination of the blade groups, blade positions, and blade sequence intervals during the cycle. The control blade operational strategy may be performed in conjunction with the core loading pattern design (core design) as part of the fuel cycle design process. A typical operational strategy may involve the use of multiple blade groups that are periodically exchanged during the cycle as a means of controlling the power shape (i.e. margins to thermal limits) as well as the hot excess reactivity.

Control blades in BWRs contain neutron-absorbing material that "damp" the nuclear reactions (and thus local power) in the proximity of the control blade when inserted into the core. Typically in a BWR, a control bladed travels in what is called a fuel channel between adjacent fuel bundles. Inserting a control blade thus decreases the core reactivity while removing the blade increases the core reactivity. Control blades "wear out" over time (i.e., the blades' absorbing capability diminishes) proportional to the usage and must be periodically replaced. Replacement of control blades involves added cost to the utility both in terms of blade purchase as well as the reactor down time (typically during a refueling outage) required to perform the control blade maintenance.

A recent phenomenon involving use of control blades in BWRs has been observed, known as a "shadow corrosion" mechanism or event. A shadow corrosion mechanism or event may occur when a control blade is inserted for extended periods of time in the proximity of fresh fuel bundles. The shadow corrosion mechanism causes hydrogen pickup in the fuel channel that results in the channel bowing later in life after an extended period of irradiation. This channel bow effect can interfere with the ability of the blade to be inserted, creating a potential safety issue since operable control blades are a requirement for shutting down the reactor in an emergency situation. Replacement of those channels exhibiting shadow corrosion phenomenon partway through the life of a fuel bundle is costly, both in terms of reactor down time and the purchase cost of the channel.

Further, individual control blade movements or blade sequence exchanges, in general, place stresses on the nuclear fuel due the effect on local power in the proximity of the blades being moved. Various "soft handling" guidelines (i.e. recommendations provided by the fuel vendor) exist for performing such blade movements. Often this involves a reduction in reactor power level as a means of reducing the stresses placed on the fuel. This impacts the overall capacity factor of the plant.

Use of control blades is integral to the design of the core loading pattern design and operational strategy. To address blade "wear out", blade management strategies are employed in which high duty blades are shuffled or swapped with low duty blades. Still, the maintenance times required are expensive with the necessity to nevertheless replace control blades. Similarly, the channel bow mitigation requires either re-channeling of fuel midway through life or alternatively, modification of the core loading pattern design to shuffle susceptible fuel to uncontrolled locations. Modification of the core loading design to mitigate channel bow places additional constraints on the core loading design with the potential for a large economic penalty in terms of having to purchase of additional fresh fuel bundles. In addition, the aforementioned, "soft handling" guidelines as well as operational rules are in place regarding control blade movement.

Traditionally, core design determinations have been made on a trial and error basis. Specifically, and based on only the past experience of the engineer or designer, in designing a core design an initial core design was identified. The initially identified design was then simulated in a computer. If a particular design constraint was not satisfied, then the arrangement was modified and another computer simulation was run. Many weeks of resources typically were required before an appropriate core design was identified using the above-described procedure.

For example, a conventional process used is a stand-alone manual design process that requires a designer to repeatedly enter reactor plant specific operational parameters into an ASCII text file, which is an input file. Data entered into the input file includes control blade notch positions of control blades (if the evaluated reactor is a boiling water reactor (BWR)), core flow, core exposure (e.g., the amount of burn in a core energy cycle, measured in mega-watt days per short ton (MWD/st), etc.

A Nuclear Regulatory Commission (NRC) licensed core simulation program reads the resulting input file and outputs the results of the simulation to a text or binary file. A designer then evaluates the simulation output to determine if the design criteria have been met, and also to verify that no violations of margins to thermal limits have occurred. Failure to meet design criteria (i.e., violations of one or more limits) require a manual designer modification to the input file. Specifically, the designer would manually change one or more operation parameter and rerun the core simulation program. This process is repeated until a satisfactory core loading pattern is achieved.

This process is extremely time consuming. The required ASCII text files are laborious to construct, and often are error prone. The files are fixed-format and extremely long, sometimes exceeding five thousand or more lines of code. A single error in the file results in a crash of the simulator, or worse, results in a mildly errant result that may be hard to initially detect, but will profligate with time and iterations to perhaps reduce core cycle energy when placed in an actual operating nuclear reactor core.

Further, no assistance is provided via the manual iterative process in order to guide a designer toward a more favorable core loading pattern design solution. In the current process, the responsible designer or engineer's experience and intuition are the sole means of determining a core design solution. Moreover, conventional core design processes to determine a desired core loading pattern design to be implemented for a given energy cycle (or cycles) have been inadequate in mitigating the channel bow problems due to the shadow corrosion phenomenon, or in reducing control blade movement so as to minimize blade wear.

SUMMARY OF THE INVENTION

A method and arrangement for determining a core design to be used in a fuel cycle in a reactor core of a nuclear reactor is described. In the method, a set of limits applicable to determining a core design is defined. The set of limits may include a target hot excess reactivity constraint to be satisfied over a given core energy cycle and a given desired control blade definition that is set for the cycle. A reference core design is generated based on the defined limits. The reference core design includes an initial loading pattern of current fresh fuel bundles arranged in a plurality of fuel locations therein, and the set control blade definition. A unique subset of fresh fuel bundles is selected, to be evaluated in the reference core design and a first iterative improvement process is performed. The first iteration may include replacing, at each fuel location, at least one of the current fresh fuel bundles with at least one of the selected fresh fuel bundles, and simulating reactor operation on the reference core design to produce a plurality of outputs. Each output may correspond to the reference core design containing one or more of the selected fresh fuel bundles. The outputs may be ranked based on the defined set of limits, and the highest ranked output may be selected as an accepted core design for the nuclear reactor that satisfies the target hot excess reactivity constraint with the given desired control blade definition.

BRIEF DESCRIPTION OF THE DRAWINGS

The exemplary embodiments of the present invention will become more fully understood form the detailed description given herein below and the accompanying drawings, wherein like elements are represented like reference numerals which are given by way of illustration only and thus are not limitative of the exemplary embodiments of the present invention.

FIG. 5 is a flow chart illustrating a simulation step in accordance with an exemplary embodiment of the invention.

FIG. 6 is a flow chart illustrating the ranking step of FIG. 4 in more detail in accordance with an exemplary embodiment of the invention.

FIGS. 8-14 are screen shots of an exemplary computer-based application to further describe various features of the method and arrangement of the present invention.

DETAILED DESCRIPTION OF THE EXEMPLARY EMBODIMENTS

In parent U.S. patent application Ser. No. 10/325,831 (the '831 application), there is described a method and arrangement for determining a core design for a nuclear reactor in which any number or combinations of fresh fuel bundle designs (e.g., "N streams") may be utilized in order to determine an accepted core design that satisfies a plurality of limits or constraints that have been input by a user. The thus determined core design may include N new fresh fuel bundle solutions therein, for example.

The exemplary embodiments described hereafter apply the methodology described in the parent '831 application to a specific problem application: determining a desired core design which satisfies a specific design constraint or limit, which is a specific target hot excess reactivity for the majority of exposure over a given energy cycle (in addition to satisfying all other user-defined input limits or constraints or within an acceptable margin to those limits or constraints). This may be accomplished with reduced or minimum control blade density, in terms of the number of control blades used in the accepted core design and the amount of blade movement during the given energy cycle (each of which may also be input as part of the defined limits), and at a set core flow window (another limit).

In a particular application, the exemplary methodology described hereafter may thus provide the potential to realize a "bladeless" core design solution or at least a core design solution which minimizes the number of control blades and movement thereof in an effort to mitigate the problem of control blade shadow corrosion (with blade interference) without economical penalty in terms of reduced operating capabilities or maintenance costs.

As used herein, the phrase "core design" refers to a core loading pattern configuration or design and placement of fresh fuel bundles and the reconfiguration of exposed bundles that are to be loaded in a core of a nuclear reactor at a next scheduled outage, for example, and includes the number, placement and movement of control blades between certain other exposed (burnt, twice-burnt, etc.) fuel bundles of the core design.

Figure 1:
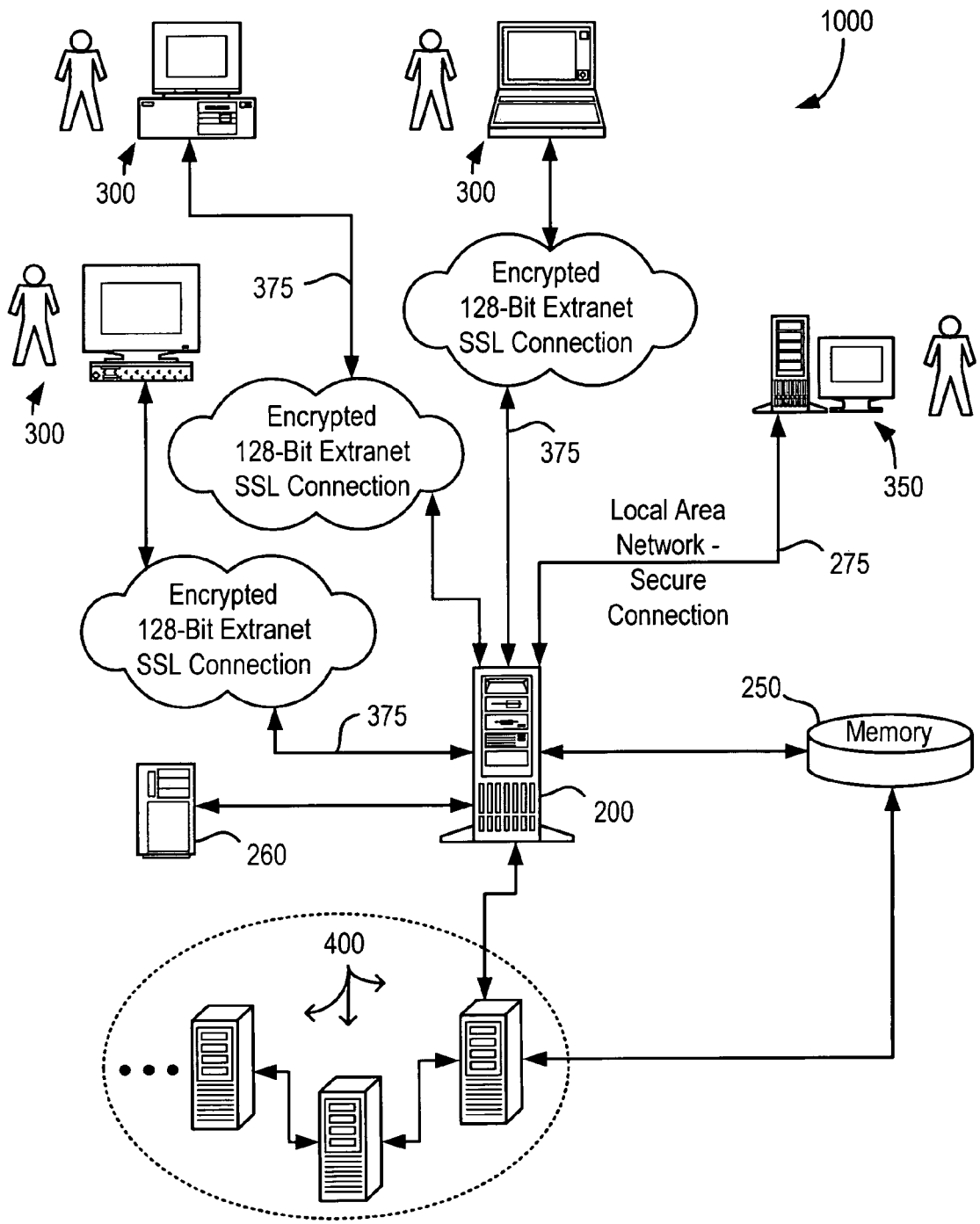
FIG. 1 illustrates an arrangement for implementing the method in accordance with an exemplary embodiment of the invention.

FIG. 1 illustrates an arrangement for implementing the method in accordance with and exemplary embodiment of the invention. Referring to FIG. 1, arrangement 1000 may include an application server 200, which may serve as a central nexus of an accessible website, for example. The application server 200 may be embodied as any known application server software, such as Citrix MetaFrame Presentation server, for example. Application server 200 may be operatively connected to a plurality of calculation servers 400, a cryptographic server 260 and to a memory 250. Memory 250 may be embodied as a relational database server, for example.

A plurality of external users 300 may communicate with application server 200 over a suitable encrypted medium such as an encrypted 128-bit secure socket layer (SSL) connection 375, although the present invention is not limited to this encrypted communication medium. An external user 300 may connect to the application server 200 over the Internet or from any one of a personal computer, laptop, personal digital assistant (PDA), etc., using a suitable interface such as a web-based Internet browser. Further, application server 200 is accessible to internal users 350 via a suitable local area network connection (LAN 275), so that internal users 350 have access over an intranet for example.

Hereafter for reasons of brevity, 'user' is employed generically to denote any of an external user 300, internal user 350 or other designer accessing arrangement 1000. For example, the user may be any of a representative of a nuclear reactor plant accessing the website to determine a desired core design for his or her nuclear reactor, and/or a vendor hired by a reactor plant site to develop core designs or particular fuel bundle designs for a core by using the methodology and arrangement of the present invention.

The application server 200 provides a centralized location for users to access an application. Essentially, each user application session may be running on the server but displayed locally to the user access device (e.g., PC) allowing the user to interact with the application. However, this means of deployment is provided as an exemplary embodiment, and does not limit a given user from running the application locally on their access device. The application is responsible for directing all calculations and accessing of data in order to calculate objective function values, and for the creation of suitable graphical representations of various features of a core design that a user may desire to review. The graphical information is communicated over the 128-bit SSL connection 375 or LAN 275, to be displayed on a suitable display device of the user.

Figure 2:
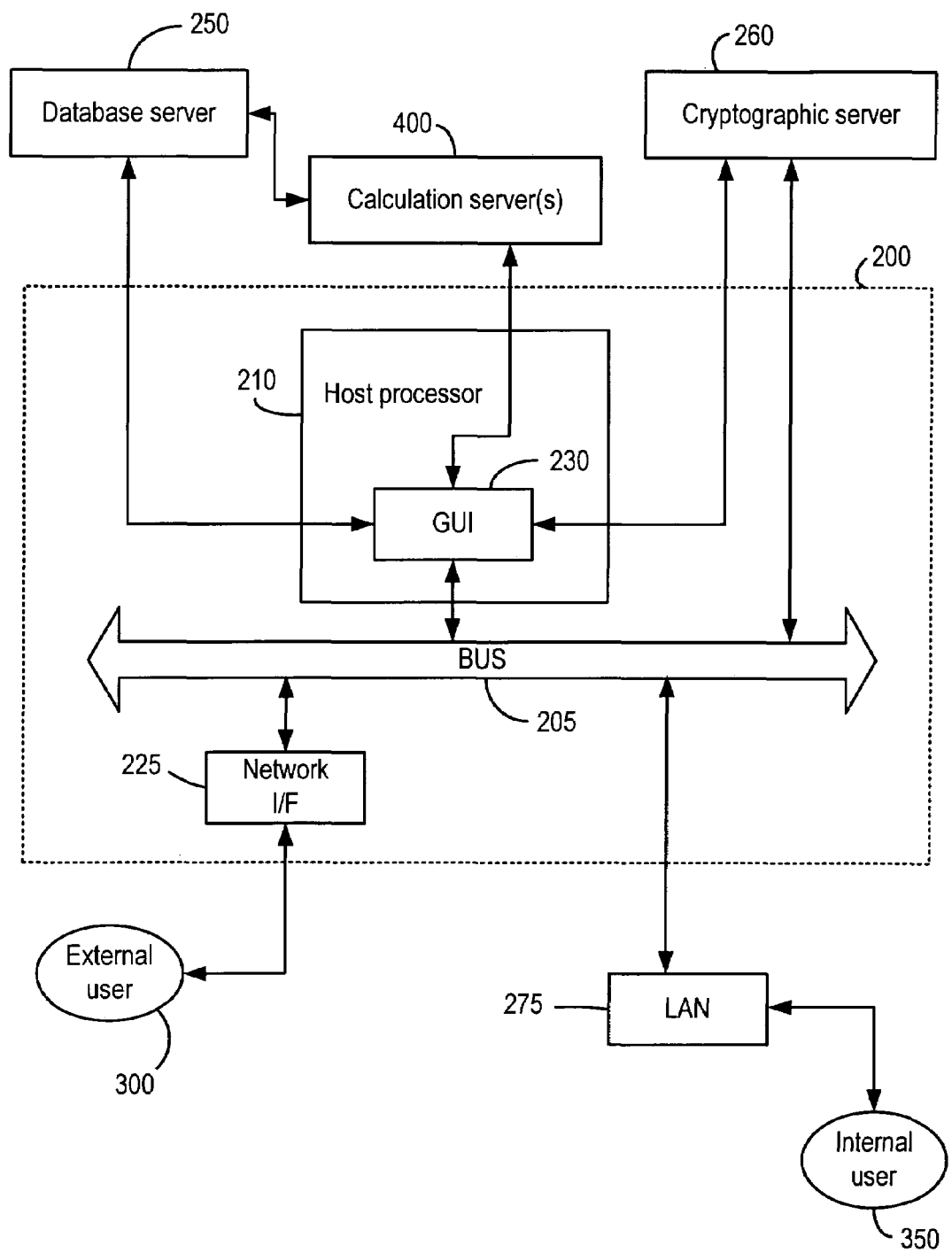
FIG. 2 illustrates an application server of the arrangement for implementing the method in accordance in an exemplary embodiment of the invention.

FIG. 2 illustrates an application server 200 associated with the arrangement of FIG. 1. Referring to FIG. 2, application server 200 utilizes a bus 205 to connect various components and to provide a pathway for data received from the users. Bus 205 may be implemented with conventional bus architectures such as peripheral components interconnect (PCI) bus that is standard in many computer architectures. Alternative bus architectures such as VMEBUS, NUBUS, address data bus, RDRAM, DDR (double data rate) bus, etc. could of course be utilized to implement bus 205. Users communicate information to application server 200 over a suitable connection (LAN 275 and/or network interface 225) to communicate with application server 200.

Application server 200 may also include a host processor 210, which may be constructed with conventional microprocessors such as currently available PENTIUM processors. Host processor 210 represents a central nexus from which all real time and non-real functions in application server 200 are performed, such as graphical-user interface (GUI) and browser functions, directing security functions, directing calculations such as calculation of the objective functions for various limits, etc., for display and review by the user. Accordingly, host processor 210 may include a GUI 230, which may be accessed through the use of a browser. Browsers are software devices, which present an interface to, and interact with, users of the arrangement 1000. In the exemplary embodiment, a browser in conjunction with a Citrix ICA client (part the commercially available Citrix MetaFrame Access Suite software) may be responsible for formatting and displaying the GUI 230.

Browsers are typically controlled and commanded by the standard hypertext mark-up language (HTML). However, the application being presented or "served" to the user which allows the user to control decisions about calculations, displayed data, etc. may be implemented using C#, Java or Visual Fortran or any combination thereof. In addition, other well-known high-level languages maybe incorporated in the applications implementation (e.g., C, C++, etc.). All of these languages may be customized or adapted for the specific details of a given application implementation, and images may be displayed in the browser using well known JPG, GIF, TIFF and other standardized compression schemes, other non-standardized languages and compression schemes may be used for the GUI 230, such as XML, ASP.NET, "homebrew" languages or other known non-standardized languages and schemes.

Application server 200 through Network I/F 225 may be operatively connected to a cryptographic server 260. Accordingly, application server 200 implements all security functions by using the cryptographic server 260, so as to establish a firewall to protect the arrangement 1000 from outside security breaches. Further, cryptographic server 260 secures external access to all personal information of registered users.

Application server 200 may be also operatively connected to a plurality of calculation servers 400. The calculation servers 400 may perform some or all the calculations required to process user entered data, direct simulation of a core design, calculate values for comparison as to be described in further detail below, and to provide results which may be displayed via, the GUI 230, and presented by the application server 200.

The calculation servers 400 may be embodied as WINDOWS 2000 servers, for example, although other hardware (e.g., Alpha, IA-64) and platforms (e.g., Linux, Unix) are possible. More particularly, the calculation servers 400 may be configured to perform a multitude of complex computations which may include, but are not limited to, configuring the objective function and computing objective function values, executing a 3D simulator program to simulate reactor core operation on a particular core design which may be loaded with fresh fuel bundles to be evaluated, and to generate outputs from the simulation, providing results data for access and display by a user via GUI 230, and iterating an optimization routine as to be described in further detail below.

Figure 3:
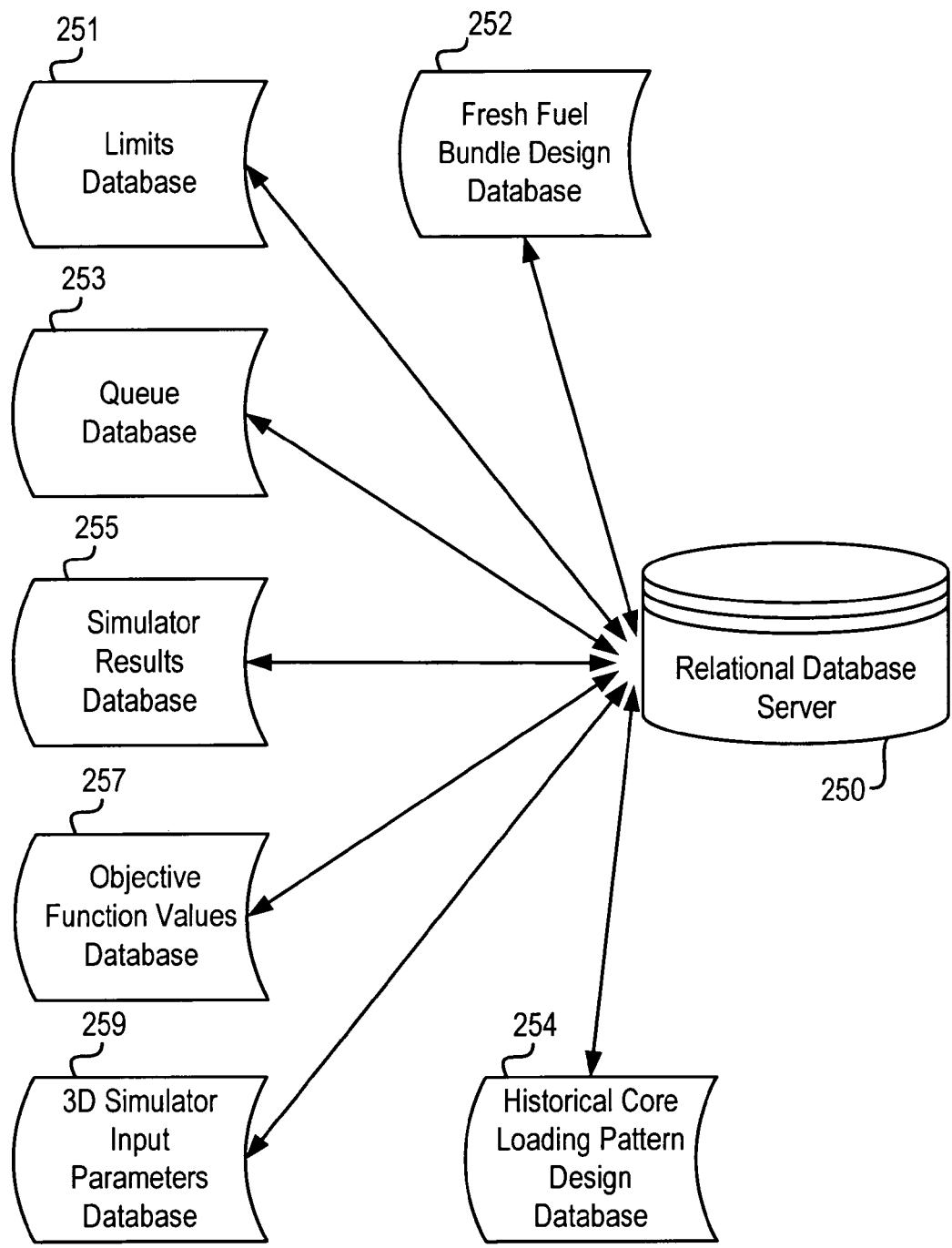
FIG. 3 illustrates a relational database having subordinate databases in accordance with an exemplary embodiment of the invention.

FIG. 3 illustrates an exemplary database server 250 in accordance with an exemplary embodiment of the invention. Memory or database server 250 may be a relational database such as an Oracle 8i Alpha ES 40 relational database server.

Relational database server 250 may contain a number of subordinate databases that handle all the necessary data and results in order to implement the method of the present invention. For example, relational database server 250 may include storage areas which contain subordinate databases such as limits database 251, which is a database that stores all the user input limits and/or design constraints for all core designs that are evaluated for a particular nuclear reactor. There may also be a fresh fuel bundle design database 252 which may include a palette or database of a variety of fresh fuel bundle designs ("N streams") that have been previously created and modeled.

Additionally, relational database server 250 may include a queue database 253, which stores all parameters for a core design that are to be simulated in the 3D simulator, and a historical core loading pattern design database 254, which includes historical reactor core designs for the exposed and fresh fuel that may be selected in generating a reference core design that is most consistent with defined limits. All simulator results may be stored in simulator results database 255. The simulator results database 255 (and limits database 251) may be accessed by the calculation servers 400 in order to calculate a number of objective function values that are applicable to a particular core design. These objective function values may be stored in an objective function values database 257 within relational database server 250. A 3D simulator input parameters database 259 may also be included within relational database server 250. Database 259 may include a configured blade group and reactor operating parameters for all exposure steps. As the calculation servers 400 are operatively connected to, and may communicate with, relational database server 250, each of the subordinate databases described in FIG. 3 may be accessible (read) by one or more calculation servers 400.

Figure 4:
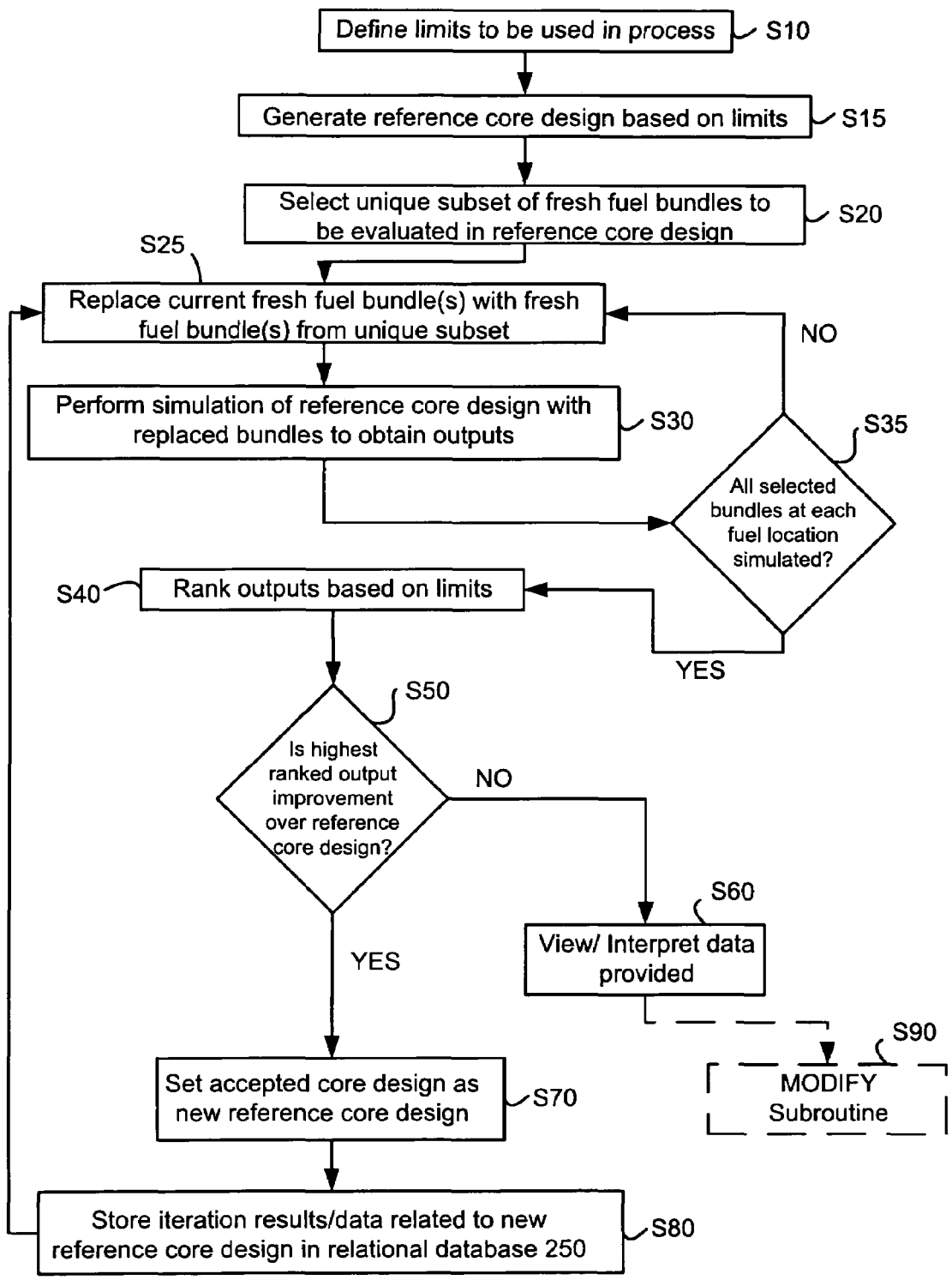
FIG. 4 is a flow chart describing the method in accordance with an exemplary embodiment of the invention.

FIG. 4 is a flow chart illustrating the method in accordance with an exemplary embodiment of the invention, which is described in terms of a core loading pattern design for an exemplary boiling water reactor, it being understood that the method and arrangement could be applicable to PWRs, gas-cooled reactors and heavy-water reactors. FIGS. 8-14 are screen shots describing an exemplary computer-based application to further describe various features of the method and arrangement of the present invention. Hereafter these figures may be occasionally referred to facilitate understanding of the exemplary methodology.

In general in the method, all limits (which at the least may include any design constraint, thermal constraint, operating parameter, etc., a customer, designer or user indicates is critical to a particular desired core design) should be understood and incorporated into a reference core design. In accordance with the exemplary embodiments, one of these defined limits is a target hot excess reactivity value, which may be embodied as a range or window between a maximum and minimum target hot excess reactivity value to be satisfied at all exposures during a given energy cycle. This may represent a dominant constraint or limit that has to be achieved by the desired core design, for example.

As will be seen below, in setting a desired target hot excess reactivity as an input, the user can select a desired combination of control blade density (which includes the number of blades and a window of notch position travel for the selected blades) and a nominal core flow window for the core design. Selection of blade position and core flow as inputs for the design problem compensate for the target hot excess reactivity window. The user may then analyze a reference core design based on the limits using a systematic process of fuel bundle replacement, core simulation to generate simulation outputs, ranking of the outputs based on the limits to determine a desired core design that meets both the target hot excess reactivity at the nominal core flow and desired blade density, as well as satisfies all other defined limits or constraints or is within acceptable margins to these limits.

Initial fresh fuel types and loading pattern for the reference core design may be determined based on an estimate from historical, similar cycles for example, accounting for the defined limits set by the user. An iterative process of improvement may then be performed on the reference core design. Results from each iteration may be viewed, if desired, and a user may determine whether the limits were met and whether maximum or desired energy output was obtained. If the results of the iterative improvement process are satisfactory, a report may be generated and provided to a customer. If the results are not satisfactory (e.g., even after the iterative process is performed, an acceptable core design solution has not been determined) a designer or user may determine modifications to be made to the reference core design (i.e., new fresh fuel loading pattern, including the introduction of additional fresh bundles, etc.). The iterative improvement process may then be repeated, as to be described in further detail below, until a satisfactory result is obtained which satisfies the dominant target hot excess reactivity constraint and all other limits. In an aspect, a user implementing the method and arrangement may utilize the GUI 230 to enable rapid processing and viewing of results, if desired, at one or more (or all) of the process steps, as stored and retrieved from one or more of the databases in the relational database server 250.

The process thus begins with the user, via GUI 230, defining the core design problem to be solved. Inputs may include plant, cycle number, cycle energy requirements, thermal limits, flow window, shutdown margin, etc. Referring now to FIG. 4, this may start with selecting a plant (S5) so that a reference core design and initial fresh fuel loading pattern may be chosen. The reactor plant may be selected from a stored list, such as is stored on an accessible database such as relational database 250 for example. The reactor to be evaluated may be any of a BWR, PWR, gas-cooled reactor or heavy water reactor, for example. Data from previously evaluated plants may be stored, and the plant listed under a suitable accessible folder such as may be accessed via a suitable input device (mouse, keyboard, plasma touch screen, etc.) and GUI 230.

Limits that are to be used in a simulation for core design of the selected plant may be defined (Step S10). These limits may be related to key aspects of the design of the particular reactor being evaluated and design constraints of that reactor, and may already be part of the historical design or may be modified or added by the user. The limits may be applicable to variables that are to be input for performing a simulation of the reference core design, and may be limits applicable to the results of the simulation (e.g., on the outputs). In general, for example, the input limits may be related to client-inputted reactor plant specific constraints and core performance criteria (e.g., energy content). Limits applicable to outputs from simulation may be related to one or more of operational parameter limits used for reactor operation, core safety limits, margins to these to these operational and safety limits and the other client-inputted reactor plant specific constraints.

As part of a conventional problem setup, the user would normally select the control blade groups to be utilized during the cycle, the length of the exposure sequences, and any blade notch exclusions, unidirectional requirements or notch rate limits that might be employed in order to satisfy operability of the selected plant.

The exemplary embodiments of the present invention deviate from the traditional problem setup in that the user defines minimum and maximum hot excess reactivity values or limits that provides a "window" which becomes the dominant constraint or limit for the core design. The user also selects a nominal value for core flow over the cycle. In terms of an objective function formulation as to be described hereafter, the hot excess reactivity receives a highest importance weighting on the penalty constraint of the objective function. The core flow may be simply fixed at its nominal value.

Based on the hot excess reactivity window and the nominal flow, the number of control blades and/or control blade notch positions needed to balance the hot excess reactivity profile over the energy cycle may easily be estimated based on the differential "worth" of the given control blades. For example, a 0.5% hot excess reactivity that remains constant over the cycle may require four (4) control blades set at notch position 10 (where notch position represents a certain fraction of insertion of the control blade into the core) for the duration of the cycle. Alternatively, a 0% hot excess reactivity would require no control blades over the cycle.

In setting the hot excess reactivity window, there are several considerations. First, for minimal blade movement during the cycle, the hot excess reactivity should remain relatively "flat" over the cycle. Second, the higher the hot excess reactivity (always a positive value), the more control blades will have to be employed (moved) to compensate (in terms of adding "negative" reactivity to counter the positive reactivity). A "bladeless" design with a 0% hot excess reactivity would be an ideal solution, as this eliminates the use of control blades in the core altogether. It is recognized, however, that uncertainties in the predictive simulation used in the design could result in the actual hot excess being greater or less than the design value. For small deviations, changes in flow rate may be used to adjust reactivity during actual operation. Therefore, when setting the nominal flow for the design it is desirable to maintain the nominal flow midpoint between a minimum and maximum allowable core flow, or core flow window.

A second consideration is for flexibility in the event of one or several fuel failures. Conventional operational practice is to insert control blades in the vicinity of the failed fuel, which, more likely than not, will be blades that are different than the blades utilized in the original design to control the hot excess reactivity. In this event it would become necessary to reduce the blade insertion of the blades employed in the design.

Once the hot excess reactivity "window", nominal flow window, and blade number with notch position estimate has been established, the blade control cells may be defined. A blade control cell may be defined by a blade core location and a grouping of four (4) fuel bundles to be placed in the control cell surrounding the blade. The bundles placed in the control cell are selected from a reload fuel inventory (i.e. the exposed fuel bundles continuing on for another fuel cycle) and, in general, do not include fresh or low duty, once burnt bundles, as control of these bundles contributes to the shadow corrosion phenomenon. For purposes of determining the core loading pattern, the control cell bundles, once defined, may be placed only in control cell locations.

Figure 16:
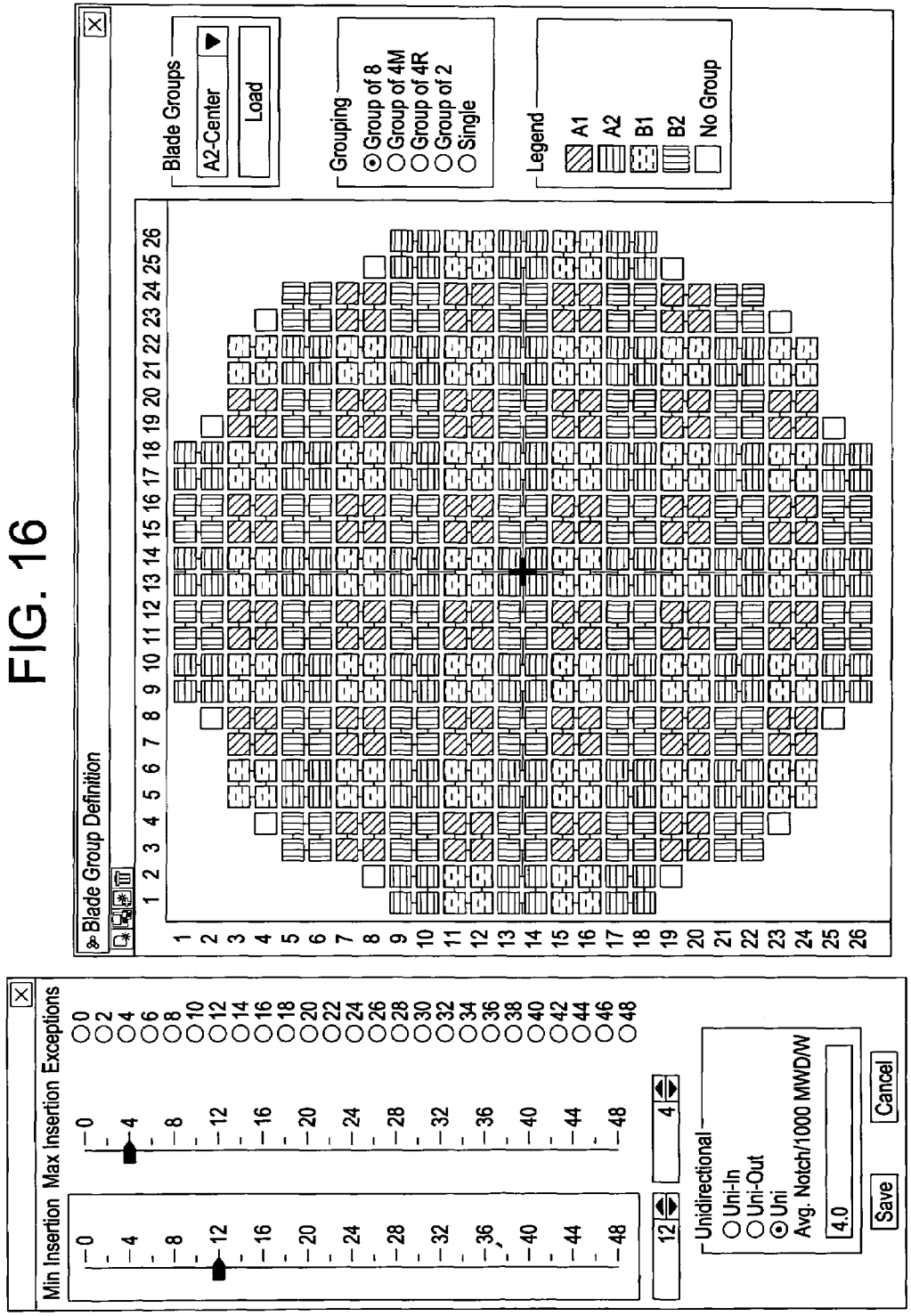
FIG. 16 displays a blade definition for a single control blade design in accordance with an exemplary embodiment of the invention.
Figure 17:
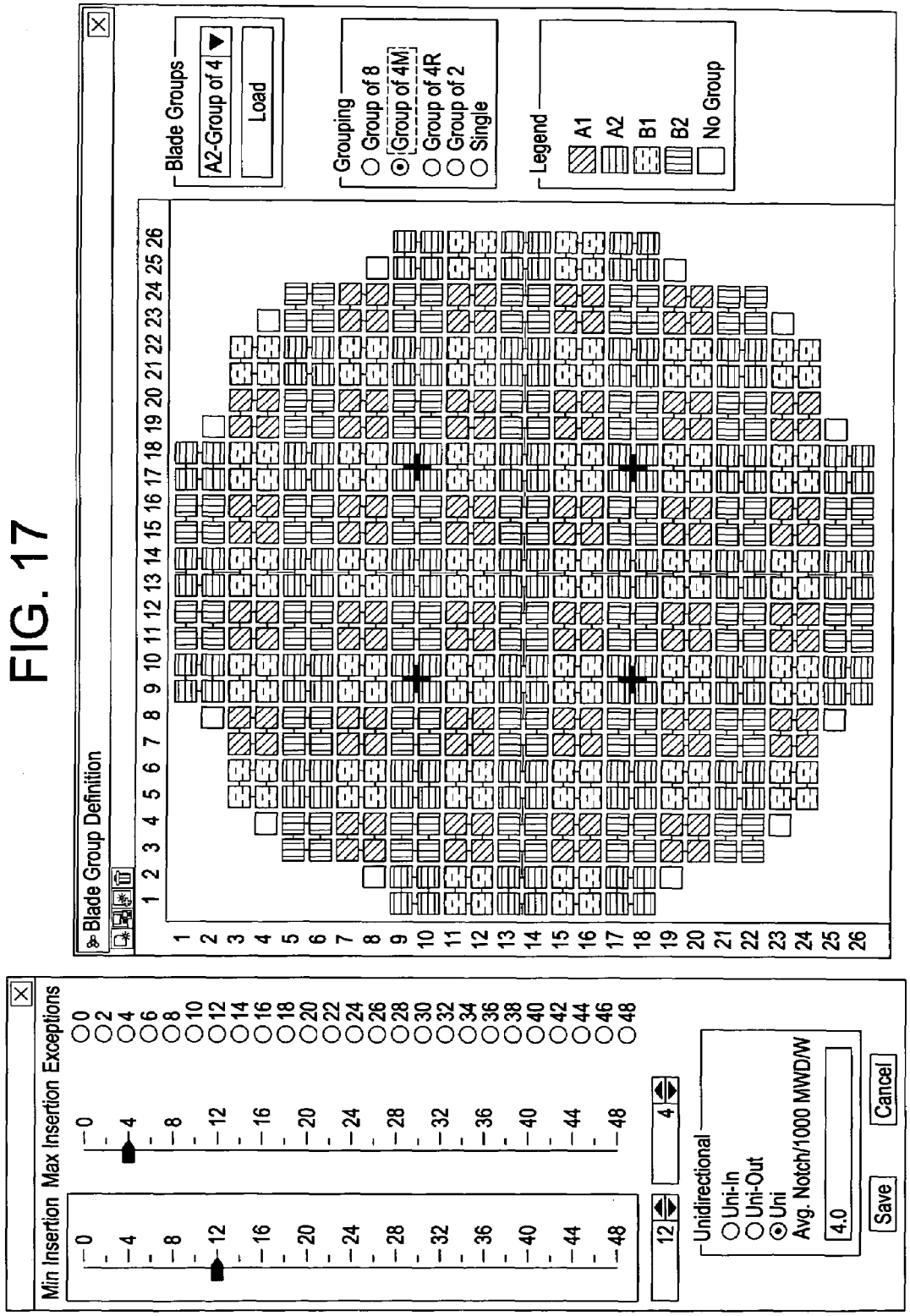
FIG. 17 displays a blade definition for a 4-control blade core design in accordance with an exemplary embodiment of the invention.

FIG. 16 displays a blade definition for a single control blade design; and FIG. 17 displays a blade definition for a 4-control blade core design. Because control blade cells contain the least reactive fuel in the reload core, placement of the control cells (i.e., selection of the control blades) will be such as to maintain the "flattest" radial core power distribution. Modern core design features, such as "ring of fire" designs, seek to achieve this flatness by placement of the most reactive fresh fuel in a series of outer "rings" of the core with a certain amount of "deadening" bundles placed towards the core center.

In general, therefore, control cells in the exemplary embodiments may be defined beginning with the central core control blade and moving outward from the core center. As it is common practice to maintain symmetry among control cells, use of control cells along the minor axes in each quadrant are also desirable.

Each of FIGS. 16 and 17 illustrates a cross section of a core design in the right-hand displayed web-page, and a setting of notch positions for the selected blade definition on the left-hand page. On the right-hand "Blade Group Definition" page is shown a window to select the desired blade definition ("Blade Groups"), and also a window to select the blade symmetry ("Grouping") and a legend to identify the blade types FIG. 16 thus illustrates a blade definition for a single control blade design (see "A2-Center" selected in the Blade Groups window of FIG. 16); and FIG. 17 displays a blade definition for a four-control blade design (see "A2-Group of 4" selected in the Blade Groups window of FIG. 17). In both cases as shown in FIGS. 16 and 17, a minimum and maximum blade notch position has also been defined on the left-hand page for the selected blade group definition, with the intent of achieving minimum blade movement over the cycle. FIGS. 16 and 17 are merely illustrative of exemplary blade definitions, the user could define any desired blade-definition satisfying symmetry and minor axis practices (such as a 0-blade, 5-blade (combination of FIGS. 16 and 17), 8-blade or 9-blade definition, for example, based on the target hot excess reactivity window set as a limit and accounting for the nominal flow window. The control cell design thus becomes an input as part of the reference core design.

FIG. 8 illustrates client-inputted plant specific constraints, which may be configured as limits on input variables to the simulation and limits on the simulation results. Referring to FIG. 8, there is listed a plurality of client-inputted plant specific constraints as indicated generally by the arrow 805. For each constraint, it is possible for the user, via GUI 230 and a suitable input device, to assign a design value limit, as indicated by column 810. As can be seen in FIG. 8, the minimum % flow and maximum % flow constraints 815, 820 may be set, as well as the target hot excess reactivity window (maximum at 825, minimum at 830).

Once all defined limits/constraints including the control cells have been defined, the next phase is to perform a design optimization of the exposed and fresh fuel in order to satisfy the limits/constraints for the problem while meeting cycle energy. The goal is to develop a core loading pattern design that meets a particular user input hot excess core reactivity target window with a desired minimum blade density over the fuel cycle, in addition to satisfying all other limits.

A reference core design with initial fresh fuel loading pattern is thus generated (S15) for the selected reactor. For example, historical core loading pattern design database 254 may be accessed to find a historical reactor core design most consistent with the defined limits. A historical core design may be consistent if it is of a similar core size and power output rating, has similar cycle energy, and has similar operational performance characteristics to the core design being developed for the selected reactor plant. Using the similar historical core design as a basis, the total energy content of the historical core may be calculated and a difference from the required energy content (e.g., the desired energy output from the determined core design, as based on customer requirements, for example) is defined. The difference in energy between the historical core and the energy content desired should be supplied by the loading of fresh fuel bundles.

Thus, to generate the reference core design, the user should select (S20) fresh fuel bundle type(s) for the reference core design that can best meet the energy requirement(s) (which may be included in the limits) for the reactor core design to be developed. The bundles designs may be selected from fresh fuel bundle design database 252, which provides a plurality of fresh fuel bundle designs (or N streams) that have been previously created and modeled.

Figure 9:
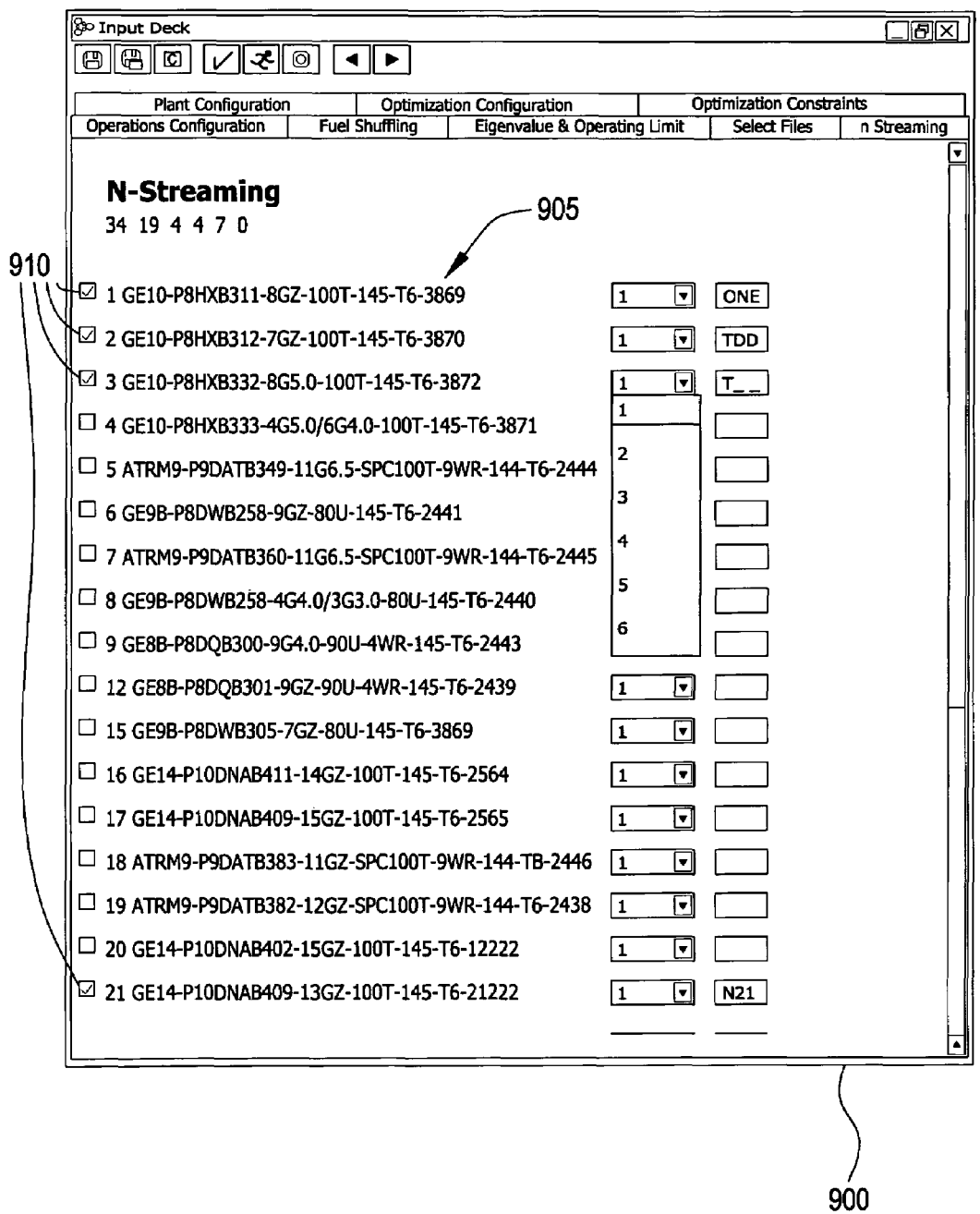

FIG. 9 illustrates a screen shot of a bundle selection web page 900. Entitled "N-Streaming", a user may bring up page 900 via GUI 230 using a suitable input device, such as a modem, keyboard, pointer and the like. A plurality of selectable fresh fuel bundle types 905 may displayed; these bundle types 905 have been previously modeled, so information relating to the performance of these bundle types 905 is readily available to the user. The user may then select desired bundle types to be used in the loading pattern of the reference core design by checking boxes 910.

With the fresh bundle types selected, core loading symmetries should be accounted for, with some plants requiring octant, quadrant, or half-core loading symmetry. This may be done by clicking on a suitable drop down menu and the like. By selecting octant symmetry, the user may model the reactor assuming that all 8 octants (where an octant is a group of fuel bundles for example) are similar to a modeled octant of fuel bundles. Consequently, simulator time is generally increased by a factor of eight. Similarly, by selecting "quadrant symmetry", the user can model the reactor assuming each of the 4 quadrants are similar to the modeled quadrant. Hence, simulator time is generally increased by a factor of four. If asymmetries in bundle properties prevent octant or quadrant symmetry, the user can also specify no symmetry. The core is thus loaded accounting for symmetries and the defined limits.

One or more current fresh fuel bundles in the reference core design may then be replaced (S25) with one or more of the selectable fresh fuel bundles 905 during an iterative improvement process. The selection may be performed via GUI 230, which provides the user with a summary of each bundle's performance characteristics. Once the "N-streaming" (selected fresh fuel bundles) have been defined, a looping process described in terms of the processes at S25 and S30 is initiated, whereby a systematic process of replacement and analysis for fresh fuel bundles is performed.

At an outermost level ("outer loop") each fresh fuel location in the current reference core design is examined in sequence. By "examined", reactor core operation is simulated (S30) for the reference core design with each particular loading pattern, and performance characteristics of the bundle are reviewed to determine whether a reference core design that can best meet the energy requirement(s) (which may be included in the limits) for the reactor core design to be developed. At the innermost level, each "replacement" fresh fuel bundle 905 selected from page 900 is examined in each fuel location. During this process, a current fresh fuel bundle in the reference core design is replaced with each new "N-streaming" fresh fuel bundle 905.

Reactor operation may be simulated (S30) on the reference core design containing one or more of the select fresh fuel bundles, in order to produce a plurality of simulated results, or outputs. The simulation may be executed by calculation servers 400; however, the simulation may be a 3D simulation process that is run external to the arrangement 1000. The user may employ well-known executable 3D simulator programs such as PANACEA, LOGOS, SIMULATE, POLCA, or any other known simulator software where the appropriate simulator drivers have been defined and coded, as is known. The calculation servers 400 may execute these simulator programs based on input by the user via GUI 230.

Thus, the user may initiate a 3D simulation at any time using GUI 230, and may have a number and different means to initiate a simulation. For example, the user may select a "run simulation" from a window drop down menu, or could click on a "RUN" icon on a webpage task bar, as is known. Additionally, the user may receive graphical updates or status of the simulation. Data related to the simulation may be queued in queue database 253 within relational database server 250. Once the simulation is queued, the user may have an audio and/or visual indication as to when the simulation is complete, as is known. The iterative steps of replacement and simulation are repeated (output of S35 is NO) until all selected fresh fuel bundles have been inserted at each fuel location and each "derivative" reference core design has been simulated (e.g., output of S35 is YES). Substitution of all selected fresh fuel bundles 905 into each of the fresh fuel locations is therefore complete upon exiting the inner and outer loops.

The iterative improvement process described above is beneficial in that it enables the user to fine tune a core design, and to perhaps extract even more energy out of an acceptable core design than was previously possible of doing with the conventional, manual iterative process. Further, incorporation of the relational database server 250 and a number of calculation servers 400 expedite calculations. The iterative improvement process as described in FIG. 4 may be done in an extremely short period of time, as compared to a number of weeks using the prior art manual iterative process of changing one parameter at a time, and then running a reactor core simulation.

The outputs from simulation are ranked based on the limits (S40). A user may display data related to each of the outputs, if desired. This enables a user to make a comparison against the reference core design to determine whether there was any improvement, where improvement may be defined in terms of not exceeding the defined limits, or meeting certain energy requirements, for example.

If the top ranked output is an improvement (output of S50 is YES) the core design corresponding to that highest ranked output is set (S70) as the new reference core design with the results stored (S80) in relational database server 250, such as in simulator results database 255. This completes one iteration of the iterative improvement process. Processes S25, S30, S40 and S50 are repeated (e.g., N iterations), with each "improvement" becoming the new reference core design for a subsequent iteration. The defined limits are applicable to the reference core design in each of the N iterations. If, for a given iteration, there is no improvement in the top ranked output, the iterative process is complete, and data relating to the reference core design at that point, since it is the top ranked design may be displayed and interpreted (S60) by the user. The data may also provide the user with an indication of which location in a simulated core were the largest violators or largest contributors to a limit violation. At S60, the user may be inclined to initiate a modify subroutine (S90). This is an optional process which typically is required only if the above iterative improvement process fails to determine a core design that is acceptable to the user. The modify subroutine will be described in further detail below.

FIG. 5 is a flow chart illustrating a simulation step in accordance with an exemplary embodiment of the invention. Once the user initiates simulation, many automation steps follow. Initially, all definitions for the core design problem are converted into a 3D instruction set (e.g., a computer job) for a 3D reactor core simulator (S31). This enables the user to have a choice of several types of simulators, such as the simulators described above. Selection of a particular simulator may be dependant on the plant criteria entered by the user (e.g. the limits). The computer job is readied for queuing in the queue database 253 of each relational database server 250 (S33). The storing of the data for a particular simulation enables any potential simulation iteration to start from the last or previous iteration. By storing and retrieving this data, future simulation iterations to a core design take only minutes or seconds to perform.

Concurrently, a program running on each of the available calculation servers 400 scans every few seconds to look for available jobs to run (S37). If a job is ready to run, one or more of the calculation servers 400 obtains the data from the queue database 253 and runs the appropriate 3D simulator. As described above, one or more status messages may be displayed to the user. Upon completion of the simulation, all results of interest may be stored (S39) in one or more subordinate databases within the relational database server 250 (e.g., simulation results database 255). Accordingly, the relational database server 250 may be accessed in order to calculate the objective function values for the test core design.

FIG. 6 is a flow diagram illustrating the ranking step of FIG. 4 in further detail. In ranking the outputs, an objective function is calculated in order to compare how closely a simulated core design meets the limits or constraints. An objective function is a mathematical equation that incorporates the constraints or limits and quantifies the core design's adherence to the limits. For example, based upon the results of the simulation and the calculated objection function values, the user, who may be a core designer, engineer or plant supervisor for example, is able to determine if a particular design meets the user's defined limit requirements (i.e., meets a maximum cycle energy requirement while satisfying all thermal limits and/or operational limits, for example).

The objective function may be stored in relational database server 250 for access by calculation servers 400. Objective function calculations, which provide objective functions values, may also be stored in the relational database server 250, such as in a subordinate objective function value database 257. Referring to FIG. 6, inputs to the objective function calculation include the limits from the limits database 251 and the simulator results from the simulator results database 255. Accordingly, one or more calculation servers 400 access this data from relational database server 250 (S41).

Although the method and arrangement of the present invention envision any number of objection function formats that could be utilized, one described example may include an objective function having three components: (a) the limit for a particular constraint parameter (e.g., design constraint for reactor plant parameter, thermal limit, etc.), represented as "CONS"; the simulation result from the 3D simulator for that particular constraint parameter, represented as "RESULT", and a multiplier for the constraint parameter, represented by "MULT". A set of predefined MULTs may be empirically determined from a large collection of BWR plant configurations, for example. These multipliers may be set at values that enable reactor energy, reactivity limits, and thermal limits to be determined in an appropriate order.

Accordingly, the method of the present invention utilizes a generic set of empirically-determined multipliers, determined from a parametric study of over 100 different core designs. However, GUI 230 permits manual changing of the multipliers, which is significant in that user preference may desire certain constraints to be "penalized" with greater multipliers than the multipliers identified by the preset defaults.

An objective function value may be calculated for each individual constraint parameter, and for all constraint parameters as a whole, where all constraint parameters represent the entity of what is being evaluated in a particular core. An individual constraint component of the objective function may be calculated as described in Equation (1):

$$OBJ_{par} = MULT_{par} * (RESULT_{par} - CONS_{par}); \quad (1)$$

where "par" may be any of the client-inputted constraints illustrated in FIG. 8, such as the maximum and minimum hot excess reactivity values of the target window. It is to be understood that these parameters are not the only parameters that could be possible candidates for evaluation, but are parameters which are commonly used in order to determine a suitable core configuration for a nuclear reactor. The total objective function may be a summation of all constraint parameters, or $$OBJ_{TOT} = SUM(par=1, 31) \{OBJ_{par}\} \quad (2)$$

Referring to Equation 1, if RESULT is less than CONS (e.g. there is no violation of a constraint), the difference is reset to zero and the objective function will be zero. Accordingly, objective function values of zero indicate that a particular constraint has not been violated. Positive values of the objective function represent violations that may require correction. Additionally, the simulation results may be provided in the form of special coordinates (i, j, k) and time coordinates (exposure step) (e.g., particular time in a core-energy cycle). Therefore, the user can see at which time coordinate (e.g., exposure step) the problem is located. Hence, the core is modified only at the identified exposure step.

In addition, objective function values may be calculated as a function of each exposure step, and totaled for the entire core design problem (S43). The objective function values calculated for each constraint, and the objective function values per exposure step, may be further examined by normalizing each objective function value to provide a percentage contribution of a given constraint to a total objective function value (S45). Each result or value of an objective function calculation is stored in a subordinate objective function value database 257 within relational database server 250.

The objective function values may be utilized in the manual determination of core development. For example, the values of the objective function calculations may be viewed graphically by the user in order to determine parameters that violate limits. Additionally, any change in objective function values over successful iterations of core design provides the user with a gauge to estimate both improvement and detriment in their proposed design.

Increases in an objective function value over several iterations indicate that the user's changes are creating a core design that is moving away from a desired solution, while successive iterations of lesser objective functions values (e.g., the objective function value decreasing from a positive value towards zero) may indicate improvements in the iterative core design. The objective function values, limits and simulation results over successive iterations may be stored in various subordinate databases within relational database server 250. Therefore, designs from past iterations may be quickly retrieved, should later modifications prove unhelpful.

FIG. 10 illustrates exemplary graphical data which a user may review. Upon completion of the objective function calculation, the user may be provided with data related to the objective function calculations, which may include limits that have been violated during the simulation of an evaluated core design. This data may be displayed by the user after each iteration, if desired. Referring to FIG. 10, there is displayed a list of constraint parameters which may represent the input limits, and the values of each of objective function value calculation on a per constraint basis. FIG. 10 illustrates limits which have been violated with a check in a box, as indicated by checked box 1005 for example. Additionally, for each limit violation, its contribution and percent (%) contribution (based on the calculations and the normalization routines described with respect to FIG. 6), are displayed. Accordingly, based on this data, the user may be provided with a recommendation as to what modifications need to be made to the core design, if any, for a subsequent iteration.

Although the individual core modifications may alternatively be left to the desires of the user, procedural recommendations may be provided in the form of a pull down menu, for example. These recommendations may be divided into three categories: energy beneficial moves, energy detrimental moves, and converting excessive margin (from thermal limit) into additional energy. One technique may be to address problems using energy beneficial moves rather than energy detrimental moves. Even if the core design meets all of the limits (client-inputted plant specific constraints, design limits, thermal limits, etc.) the user may verify that any excessive margin to a particular limit is converted into additional energy. Accordingly, the following logic statements may represent the above procedural recommendations:

Energy Beneficial Moves
    If Critical Power Ratio (CPR) margin is too low towards core perimeter, bring more reactive fuel toward core center
    If NEXRAT (Nodal Exposure Ratio, a thermal margin constraint) problem at end-of-cycle (EOC), move more reactive (e.g., less exposed) fuel to problem location;
    If ShutDown Margin (SDM) problem at perimeter of core at beginning of cycle (BOC), place less reactive fuel towards perimeter Energy Detrimental Moves
    If CPR margin too low at EOC, move less reactive fuel into problem location
    If kW/ft margin too low at EOC, move less reactive fuel into problem location Converting Excessive Margin into Additional Energy
    If extra CPR margin in center of core at EOC, move more reactive fuel from perimeter locations to core center Based on the location, and on the time exposure of limit violations, as indicated by the objective function, a user may easily follow one or more of the above recommendations to address and fix constraint violations.

The data resulting from the objective function calculations may be interpreted on a suitable display device. For example, this data may be displayed as a list of constraints with denoted violators, as described with respect to FIG. 10. However, the user may access a number of different "result" display screens that may configurable as 2- or 3-dimensional views, for example. The following Table 1 lists only some of the exemplary views available to the user.

TABLE 1

EXEMPLARY GRAPHICAL VIEWS AVAILABLE TO USER

Objective function results - listing
Graph of max core value vs. exposure
Graph of nodal maximum value vs. exposure
Graph of location of max core value vs. exposure TABLE 1-continued

EXEMPLARY GRAPHICAL VIEWS AVAILABLE TO USER

Graph of pin value vs. exposure
Graph of bundle maximum value vs. exposure
View 3D rotational diagram
Report performance relative to previous iteration
Report improvement rates of various designers
Display of server status
Display of queue status
Display system recommendations Each of these exemplary graphical views may utilize color to aid the user in examining the results. Also, the 3-D Simulator results can be compared against the constraints on the same 1-D, 2-D, or 3-D plot. Color modifications and graphic dynamics have been used to more clearly detail any violation. This information in combination with the objective function components may illustrate to the design engineer, the status of the core design identified and locations of any problem areas in the design (if any).

From the viewing aspect of this N-streaming design, the user can determine if the core design satisfies the design constraints/limits set forth by the customer, which in the exemplary application includes satisfying the dominant hot excess reactivity window constraint at the desired blade density and core flow. If the objective function is equal to zero, the constraints are met. However, prudent designers also determine if design fundamentals indicative of maximum or desired energy output are obtained. These characteristics include good thermal margin utilization, less reactive bundles loaded preferentially towards the outside, and more reactive bundles loaded toward the core center.

Figure 11A:
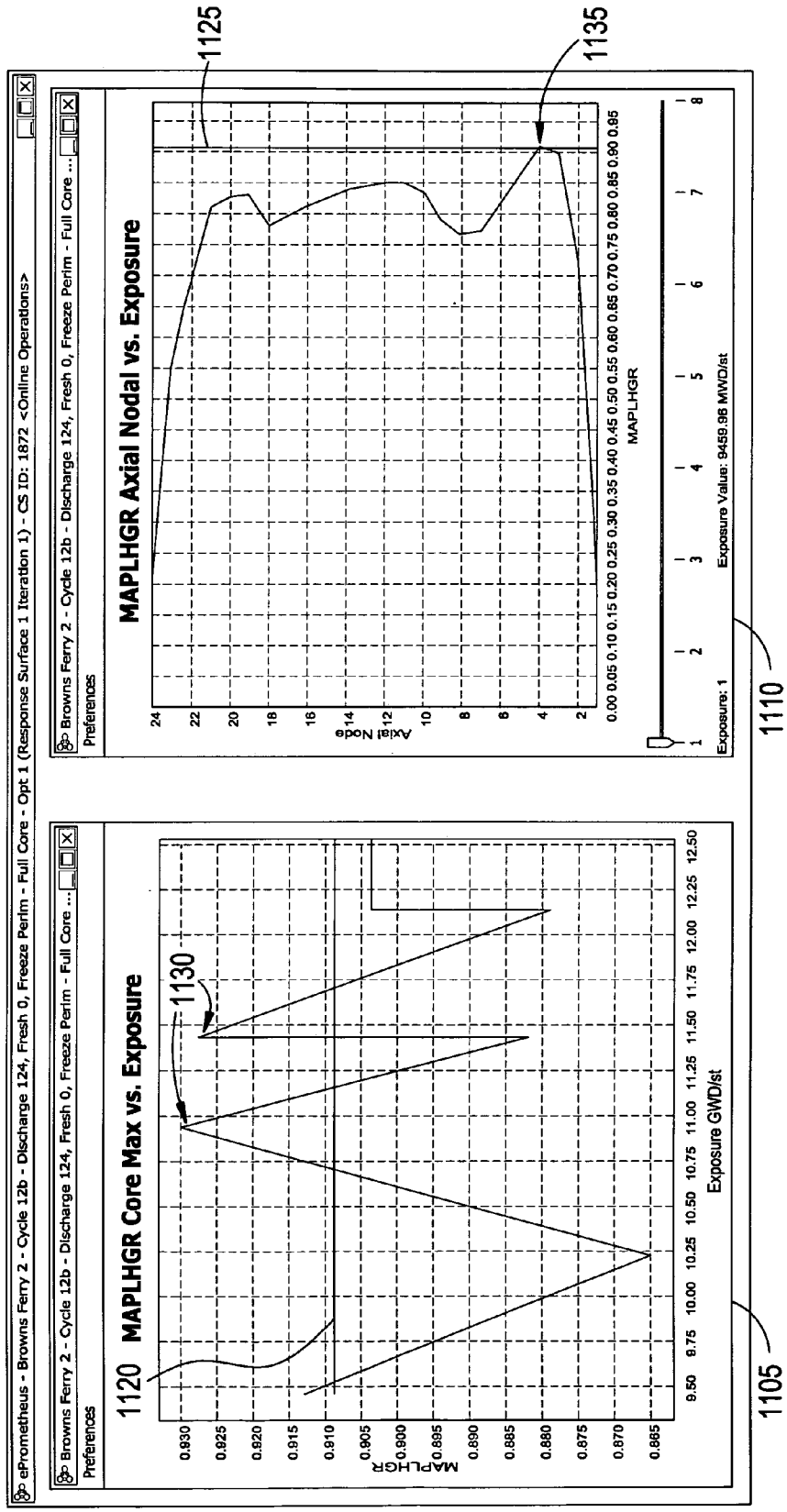
Figure 11B:
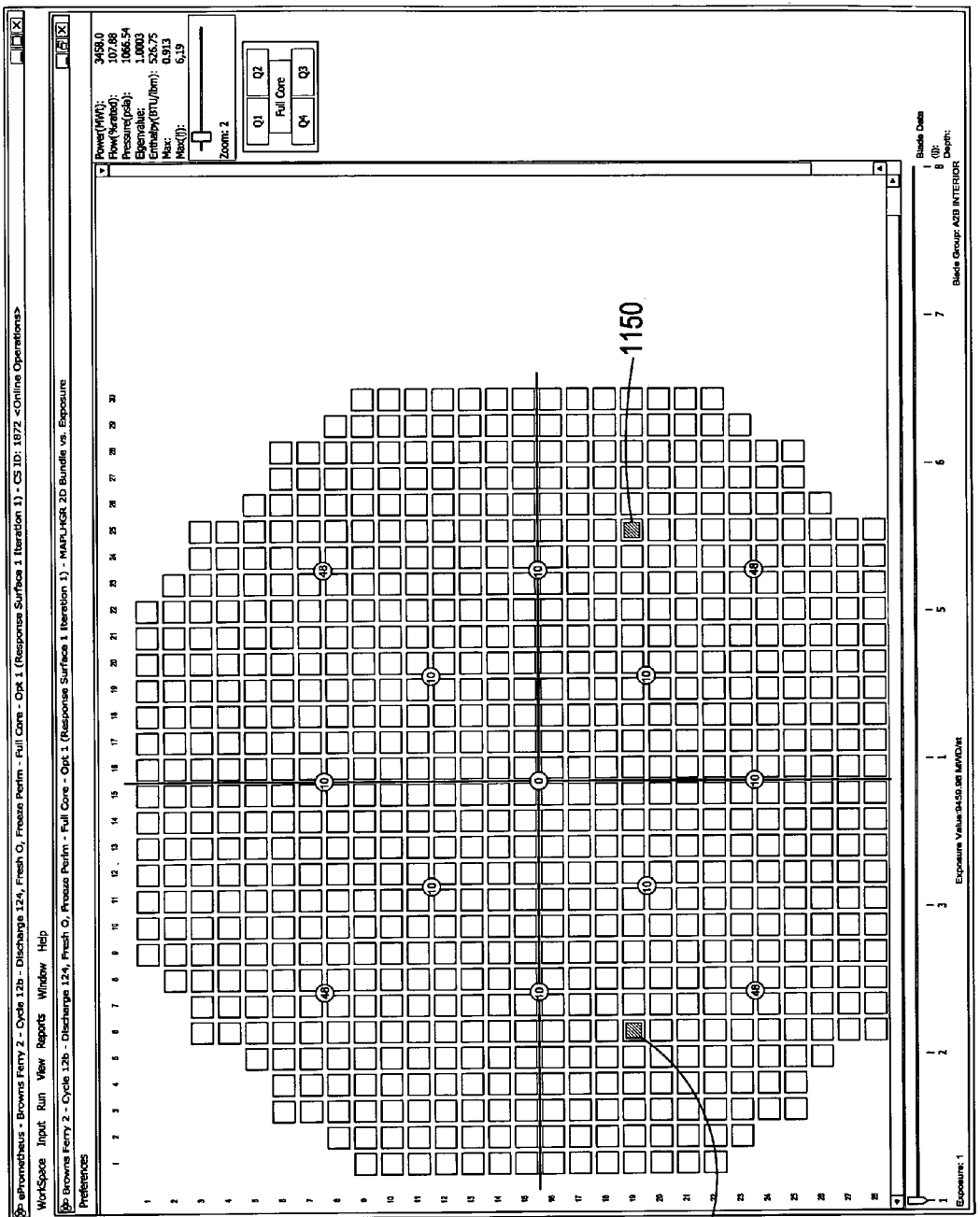

FIGS. 11A and 11B illustrate graphical views available to the user in accordance with the invention. A user may pull down a suitable drop down menu from a "view" icon on a task bar in order to display views of certain constraints or parameters. The user simply selects the desired view and may then access a page such as is illustrated in FIG. 11A or 11B. FIG. 11A illustrates two different 2-dimensional graphs of particular constraints, as seen at 1105 and 1110. For example, the user can determine where violations of Maximum Average Planar Heat Generation Rate (MAPLHGR) occur (in a core maximum vs. exposure graph 1105, and an axial values of MFLPD vs. exposure graph 1110) for a particular exposure in a core cycle. The limits for these constraints are shown by lines 1120 and 1125, with violations shown generally at 1130 and 1135 in FIG. 11A.

FIG. 11B illustrates another view, in this case a two dimensional view of an entire cross section of a core, in order to see where the biggest violation contributors for MAPLHGR vs. exposure are located. As can be seen at 1140 and 1150, the encircled squares represent fuel bundles that are the largest violation contributors to MAPLHGR in the core (e.g., 1140 and 1150 pointing to bundles violating MAPLHGR). This gives the user an indication of where the core design may need modification.

Figure 7A:
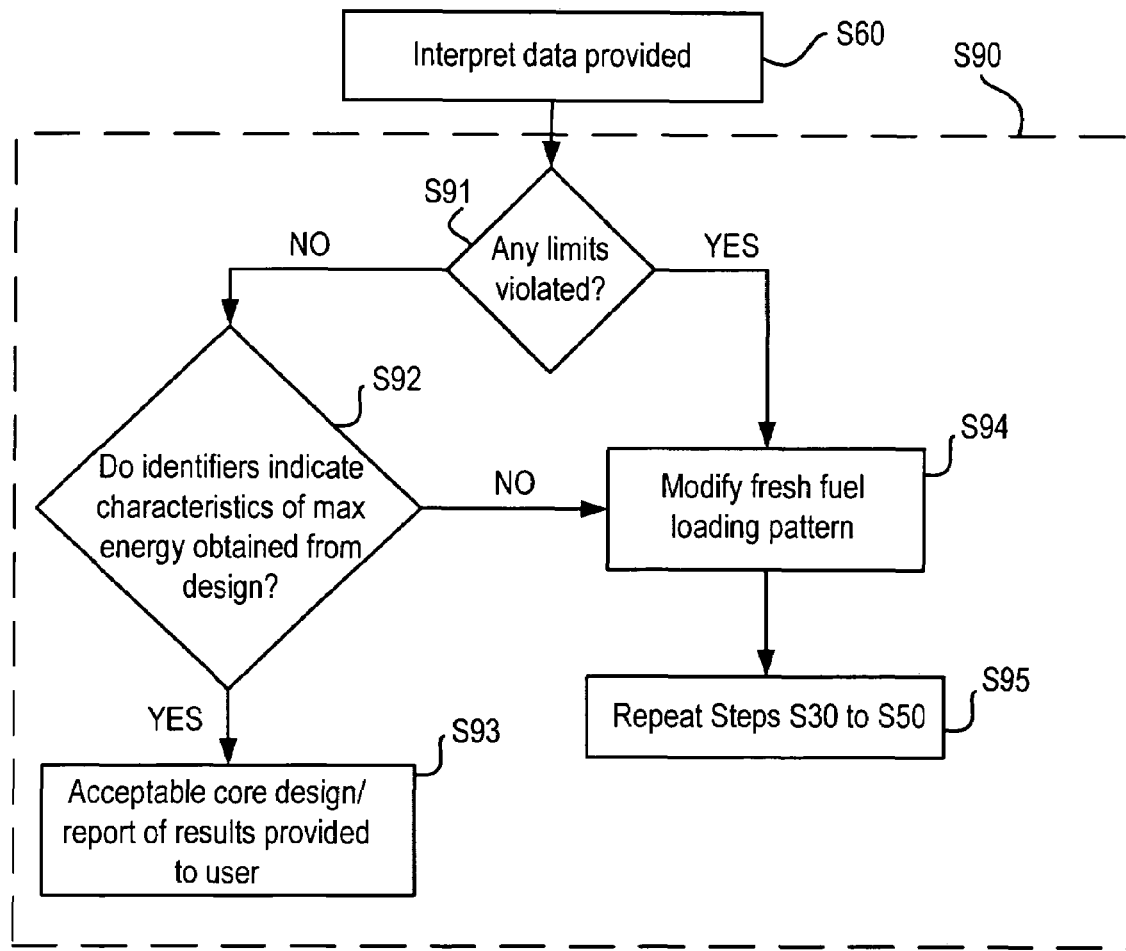
FIGS. 7A and 7B are flow charts illustrating the modification of an accepted core design in accordance with an exemplary embodiment of the invention.
Figure 7B:
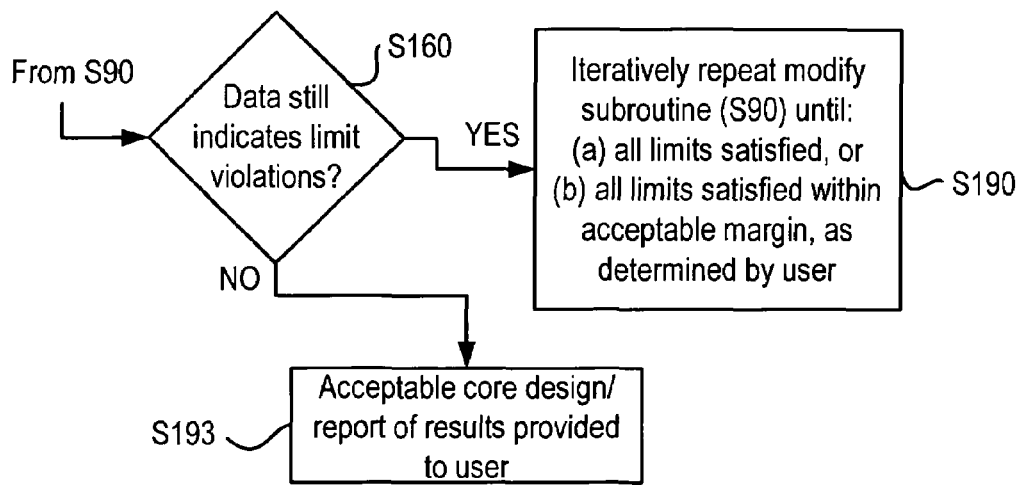

FIGS. 7A and 7B are flow diagrams describing a modify subroutine in accordance with an exemplary embodiment of the invention. Referring to FIG. 7A, by interpreting the data at S60, the user may be inclined to initiate a modify subroutine (S90). In such a case practicality, the original reference core design will not be an acceptable design, and a modify subroutine may be required if the iterative improvement process fails to provide a core design that is acceptable to the user, such as may be the case where certain limits which shall not be violated are still violated with each iteration.

In one embodiment, the user can manually direct this modifying subroutine, with the help of GUI 230. In another embodiment, the subroutine may be performed within the bounds of an optimization algorithm that automatically iterates modifying of the reference core design, simulation, calculation of objective function and evaluation of the results or values of the objective function calculations for a number of core design iterations.

The user determines, based on the displayed data, whether any limits are violated (S91). If no limits are violated, the user determines if any identifiers indicate that characteristics of maximum (or desired) energy are obtained from the core design. For example, these identifiers may include an indication of good thermal margin utilization (such as margins on MFLCPR and LHGR) by moving fuel so as to maximize plutonium generation for cycle extension. As an example, energy requirements may be shown to be met when the minimum EOC eigenvalue is obtained for the core design to be used for the fuel cycle (eigenvalue search) or the desired cycle length is determined at a fixed EOC eigenvalue. If there is an indication that maximum energy has been obtained from a core design (the output of S92 is YES), an acceptable core design has been determined, and the user may access a report of the results related to the core design (S93).

If limits are violated (the output of S91 is YES) or limits are not violated but there is an indication that maximum energy has not been obtained from the core design (the output of S92 is NO) then the user determines a fresh fuel loading pattern modification to be made to the current reference core design (S94). This is where the user may either make individual core modifications, or use the system-provided procedural recommendations described above (energy beneficial moves, energy detrimental moves, and converting excessive margin (from thermal limit) into additional energy) by accessing a pull down menu, for example. Additionally, if several iterations of core design changes have been attempted and there has been no real improvement to the objective function, this is a further indication that an alternative core design with a different fresh fuel loading pattern might need to be explored.

In making a modification to the fresh fuel loading pattern of the core design, and based on the recommendations from above, the user may alter the fresh fuel bundle loading via the GUI 230. For example, and using a suitable input device and GUI 230, a designer may identify the bundle symmetry option of any potential fresh fuel bundle(s) in the reference core design to be moved, and may select the "target" fresh fuel bundle(s), the destination(s) where the target bundle(s) is/are to be moved. The identified target bundles are then "shuffled" according to the required symmetry (mirror, rotational, etc.). This process may be repeated for any fresh bundle shuffle that is required to re-load the core reference pattern in the desired manner.

Figure 12:
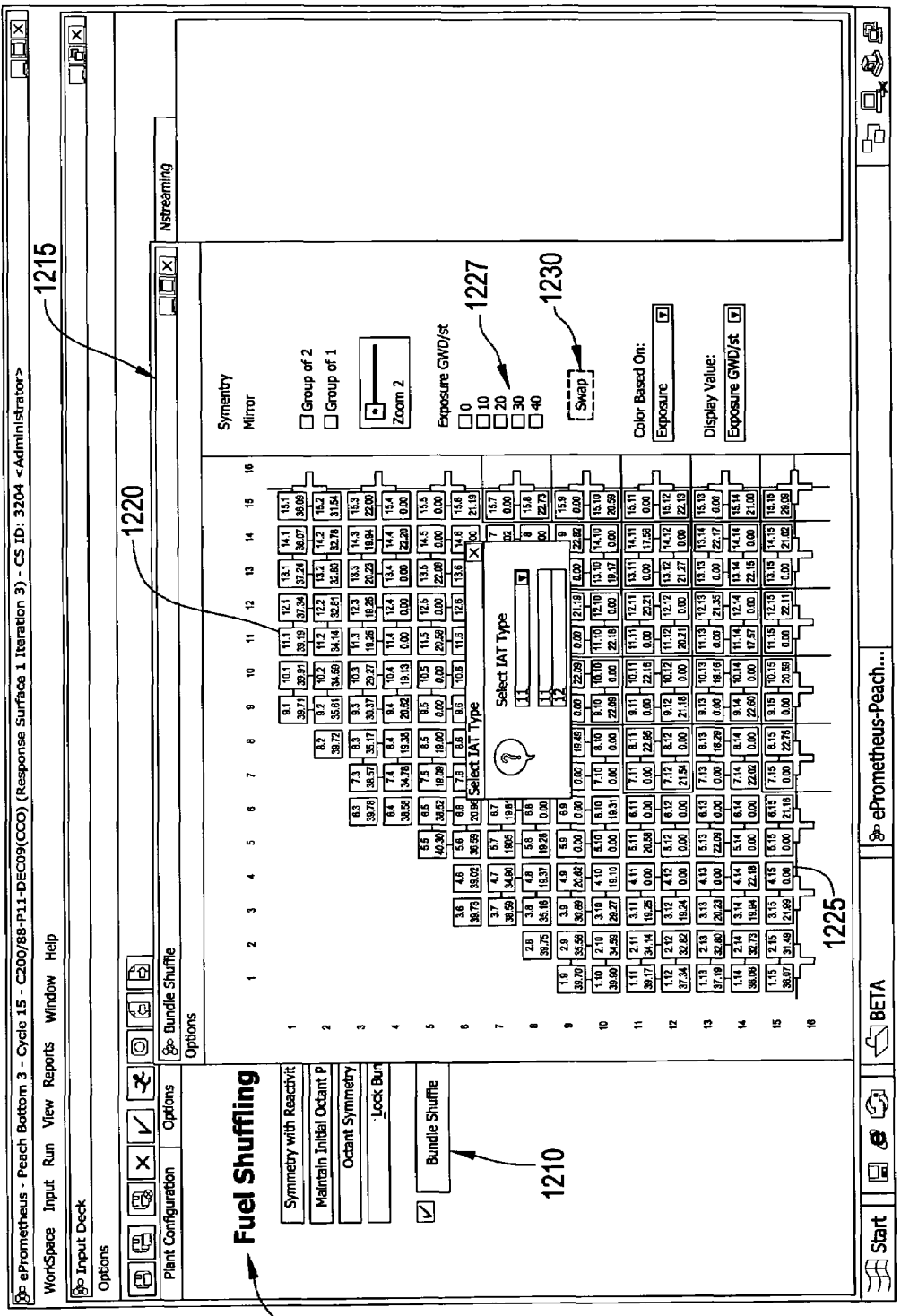

FIG. 12 is a screen shot illustrating the modifying subroutine in further detail in accordance with an exemplary embodiment of the invention. FIG. 12 illustrates the functionality available to the user so as make swift design modifications to a reference core design. A user may select a fuel shuffling page 1205 and may select a "bundle shuffle" taskbar 1210 in order to display a screen 1215 of a portion of the reference core design. In FIG. 12, a fresh fuel bundle designated at 1220 is being changed from one fresh fuel bundle type (IAT type 11) to another (IAT type 12). An exposed fuel bundle may be swapped (S94 in FIG. 7(*a*)) with a fresh fuel bundle by selecting a fresh fuel bundle in the core design, the exposed fuel bundle, and selecting the "SWAP" button 1230.

The portion of the reference core shown in screen 1215 may be color coded to show the various exposures (GWD/st) of each of the fuel bundles. Such a color coding key may be displayed as indicated at 1227 for example. Selection of items in FIG. 12 may be effected by use of a suitable input device, such as a mouse, keyboard, touch screen, etc., as is known.

These reference core design modifications may be saved in relational database 250, such as in 3D Simulator input parameters database 259, for example. A user may repeat processes S30 to S50 (S95) incorporating the design modifications. The resultant highest ranked output establishes a new reference core design from which the iterative improvement process of FIG. 4 may be repeated. In other words, Processes S30-S50 may be repeated to determine if the derivative core design meets all limits (S95). This may become an iterative process, as described above.

FIG. 7B illustrates an iterative process in accordance with an exemplary embodiment of the invention. For each derivative core design from the modify subroutine of S95 that has been simulated, the user determines whether any data that is related to the ranking at S40 (e.g., the calculated objective function values) still indicates that there are limit violations. If not, the user has developed an acceptable core design that may be used in a particular reactor, and may access graphical results related to the acceptable core design (S193).

If an iteration still indicates that limits are violated (the output of S160 is YES) then the modify subroutine in S90 is iteratively repeated until all limits are satisfied, or until all limits are satisfied within a margin that is acceptable, as determined by the user (S190). The iterative process is beneficial in that it enables the user to fine tune a core design, and to perhaps extract even more energy out of an acceptable core design than was previously possible of doing with the conventional, manual iterative process. Further, incorporation of the relational database server 250 and a number of calculation servers 400 expedite calculations. The iterative process as described in FIG. 7B may be done in an extremely short period of time, as compared to a number of weeks using the prior art manual iterative process of changing one parameter at a time, and then running a reactor core simulation.

To this point, the method and arrangement of the present invention have been described in terms of a user or designer interpreting data via GUI 230 and modifying a reference core design iteratively, by hand, based on displayed feedback (the data from the objective function) in order to get a desired design. However, the aforementioned steps of FIGS. 4, 7A and 7B may also be effectuated by way of an optimization process. The optimization process iterates the steps in FIGS. 4, 7A and 7B over a number of different core designs, constantly improving on violated limits in order to achieve an optimal core design to be used in a nuclear reactor core.

Figure 13:
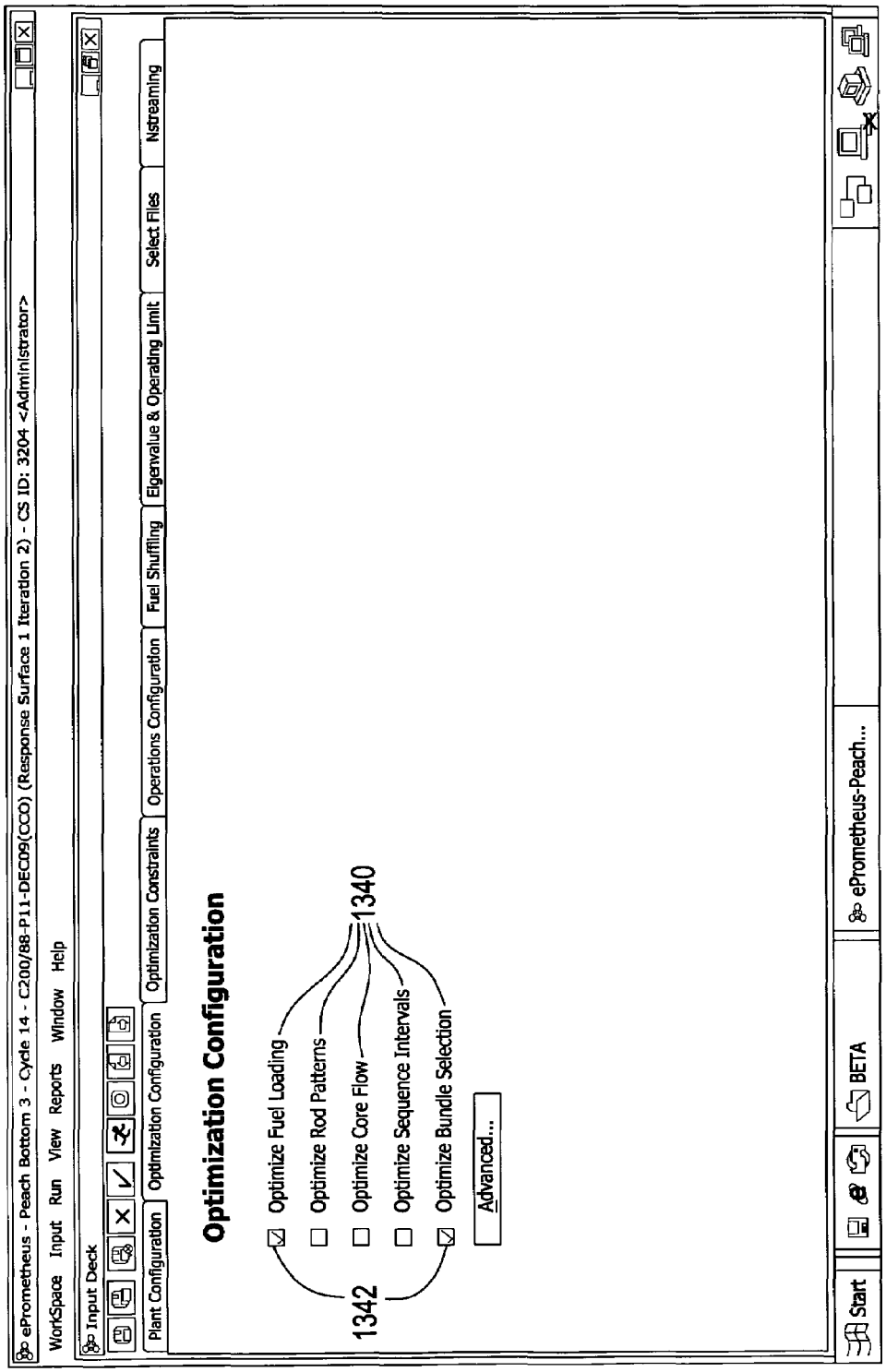

FIG. 13 illustrates a screen shot to initiate such a process. For example, after selecting the plant and generating a reference core design, the user may display an optimization configuration screen 1305. The user may select optimization parameters 1340 of optimize fuel loading, optimize rod patterns, optimize core flow, optimize sequence intervals and optimize bundle selection, for example.

Optimize bundle selection means making an optimal determination of fresh bundle types within the reference core design. As a result of the optimization, each fresh location may contain any one of a number of fresh bundle types (e.g., IAT types as shown in FIG. 12, for example) These types may be selected to maximize energy while satisfying constraints, as described above. Optimize rod patterns means to make an optimal determination on control blade (or control rod if PWR) position. Rod positions affect the local power as well as the nuclear reaction rate. Optimize core flow means making an optimal determination of reactor coolant flow rate through the reactor as a function of time during the operating cycle. Flow rate affects global reactor power as well as the nuclear reaction rate. Optimize sequence intervals means making an optimal determination of the time duration a given sequence (i.e., control rod grouping) is used to control the reactor during the operating cycle. Sequence intervals affect local power as well as the nuclear reaction rate.

Using a suitable input device (e.g., keyboard, mouse, touch display, etc.), the user may select, via GUI 230, one or more of the optimization parameters by clicking in the selection box 1342 associated with an optimization parameter 1240. When selected, a check appears in the selection box 1342 of the selected optimization parameter. Clicking in the selection box 1342 again de-selects the optimization parameter. For example, to perform an optimization, a user might select the optimize fuel loading and optimize bundle selection boxes 1342, as illustrated in FIG. 13.

Memory (relational database server) 250 may also store constraint parameters associated with the optimization problem. These may be stored in limits database 251 for example. The constraint parameters are parameters of the optimization problem that must or should satisfy a constraint or constraints, where a constraint may be analogous to the limits described above.

Figure 14:
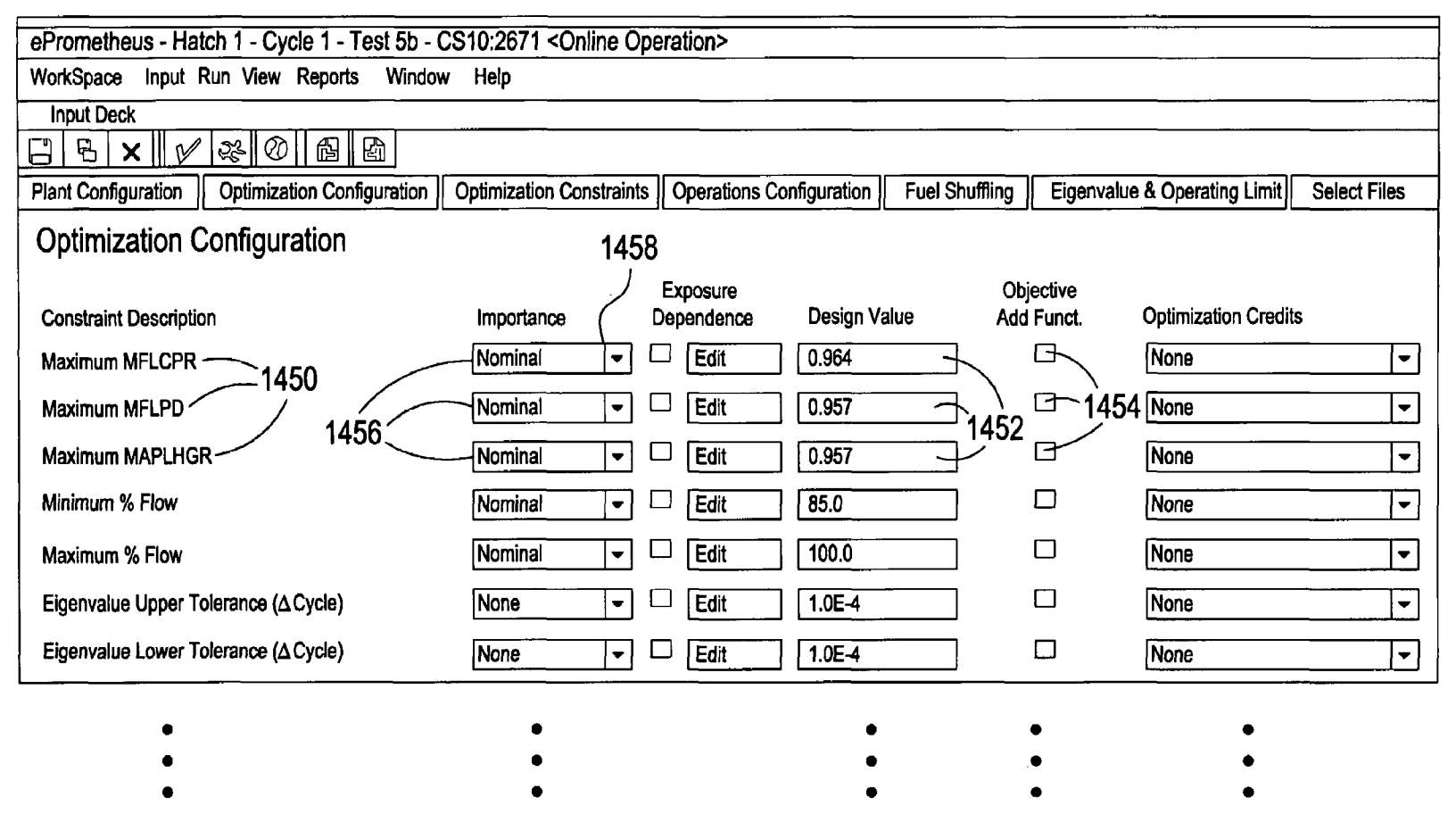

FIG. 14 illustrates a screen shot of an exemplary optimization constraints page listing optimization constraints associated with an optimization problem of boiler water reactor core design. Only a few constraints are shown for reasons of brevity. As shown, each optimization constraint 1450 has a design value 1452 associated therewith. Each optimization constraint must fall below the specified design value. The user has the ability to select optimization parameters for consideration in configuring the objective function. The user selects an optimization constraint by clicking in the selection box 1454 associated with an optimization constraint 1450. When selected, a check appears in the selection box 1454 of the selected optimization constraint 1450. Clicking in the selection box 1454 again de-selects the optimization constraint.

Each optimization parameter may have a predetermined credit term and credit weight associated therewith stored in relational database server 250. Similarly, each optimization constraint has a predetermined penalty term and penalty weight associated therewith, which may be stored in relational database server 250, such as in limits database 251 and/or objective function values database 257.

As seen in FIG. 14, the penalty term incorporates the design value, and the user can change (i.e., configure) this value as desired. Additionally, the embodiment of FIG. 14 allows the user to set an importance 1456 for each optimization constraint 1450. In the importance field 1458 for an optimization constraint, the user may have pull down options of minute, low, nominal, high and extreme.

For example, the dominant target hot excess reactivity constraints may be assigned the maximum penalty term and weight. This may be best shown in FIG. 8 (which shows a complete list of exemplary optimization constraints unlike FIG. 14), in which the maximum and minimum % hot excess reactivity design values are set at 1.0 and 0.8 and the importance field is set to extreme. This reflects the target hot excess reactivity constraints as the dominant penalty term and dominant penalty weight for the optimization in general and in particular for the objective function.

Each option correlates to an empirically predetermined or given penalty weight such that the greater the importance, the greater the predetermined penalty weight. In this manner, the user selects from among a set of predetermined or given penalty weights.

Once the above selections have been completed, a calculation server 400 retrieves the selections above from relational database server 250 and configures the objective function according to the generic definitions discussed above and the selections made during the selection process. The resulting configured objective function equals the sum of credit components associated with the selected optimization parameters plus the sum of penalty components associated with the selected optimization constraints.

Additionally, this embodiment provides for the user to select a method of handling the credit and penalty weights. For example, the user is supplied with the possible methodologies of static, death penalty, dynamic, and adaptive methodologies for the penalty weights; is supplied with the possible static, dynamic and adaptive methodologies for the credit weights; and a relative adaptive methodology for both the penalty and credit weights. The well-known static methodology maintains the weights at their initially set values. The well-known death methodology sets each penalty weight to infinity. The well-known dynamic methodology adjusts the initial weight value during the course of the objective function's use in an optimization search based on a mathematical expression that determines the amount and/or frequency of the weight change.

The well-known adaptive methodology is also applied during the course of an optimization search. In this method, penalty weight values are adjusted periodically for each constraint parameter that violates the design value. The relative adaptive methodology is disclosed in U.S. patent application Ser. No. 10/246,718, entitled METHOD AND APPARATUS FOR ADAPTIVELY DETERMINING WEIGHT FACTORS WITHIN THE CONTEXT OF AN OBJECTIVE FUNCTION, by the inventors of the subject application, filed on Sep. 19, 2002.

Optimization Using the Objective Function

Figure 15:
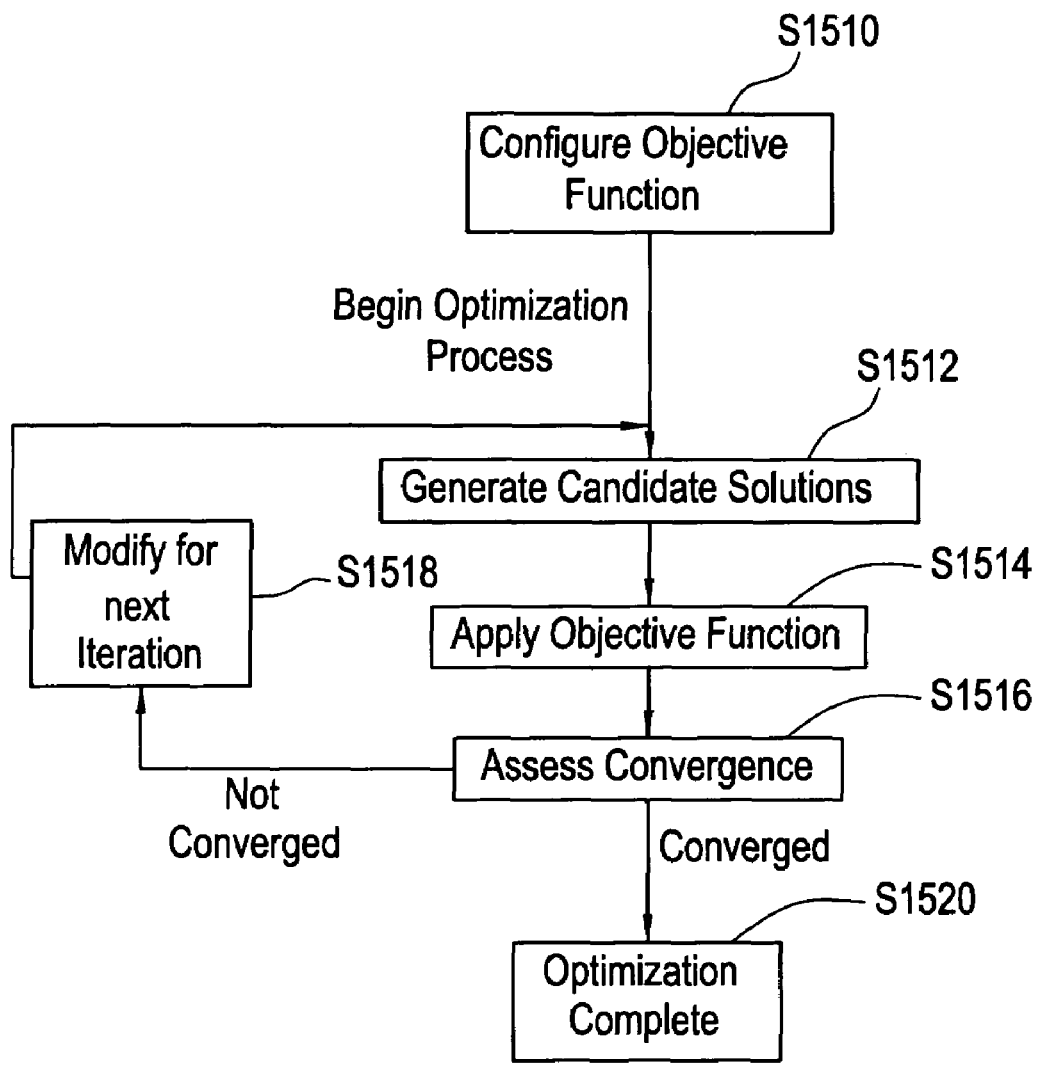
FIG. 15 is a flow chart describing an optimization routine used in accordance with an exemplary embodiment of the invention.

FIG. 15 illustrates a flow chart of an optimization process employing the objective function in accordance with an exemplary embodiment of the present invention. This optimization process is disclosed in U.S. patent application Ser. No. 10/246,716, entitled METHOD AND APPARATUS FOR EVALUATING A PROPOSED SOLUTION TO A CONSTRAINT PROBLEM, by the inventors of the subject application, filed on Sep. 19, 2002.

For the purposes of explanation only, the optimization process of FIG. 15 will be described as being implemented by the architecture illustrated in FIG. 1. As shown, in S1510 the objective function is configured as discussed above in the preceding section, then the optimization process begins. In S1512, the calculation servers 400 retrieve system inputs from relational database 250, or generate one or more sets of values for input parameters (i.e., system inputs) of the optimization problem based on the optimization algorithm in use. For example, these input parameters for a minimum blade use design may include: 1) the configuration of a blade group (i.e. blade locations as a function of cycle exposure), 2) a notch position for each of the blades within the blade group, 3) a minimum and maximum hot excess reactivity as a function of cycle exposure, 4) a core flow value as a function of cycle exposure, and 5) the fresh and exposed fuel configuration within the core design.

Each input parameter set of values is a candidate solution of the optimization problem. The core simulator as described above runs a simulated operation and generates a simulation result for each input parameter set of values. The simulation result includes values (i.e., system outputs) for the optimization parameters and optimization constraints. These values, or a subset of these values, are values of the variables in the mathematical expressions of the objective function.

Then, in S1514, a calculation server 400 uses the objective function and the system outputs to generate an objective function value for each candidate solution. In S1516, the calculation server 400 assesses whether the optimization process has converged upon a solution using the objective function values generated in S1514. If no convergence is reached, then in S1518, the input parameter sets are modified; the optimization iteration count is increased and processing returns to S1512. The generation, convergence assessment and modification operations of processes S1512, S1516 and S1518 are performed according to any well-known optimization algorithm such as Genetic Algorithms, Simulated Annealing, and Tabu Search. When the optimization is utilized to determine an acceptable core design, the optimization is run until convergence (e.g., acceptable results as in processes S93/S193 of FIGS. 7A and 7B) is obtained.

Figure 18:
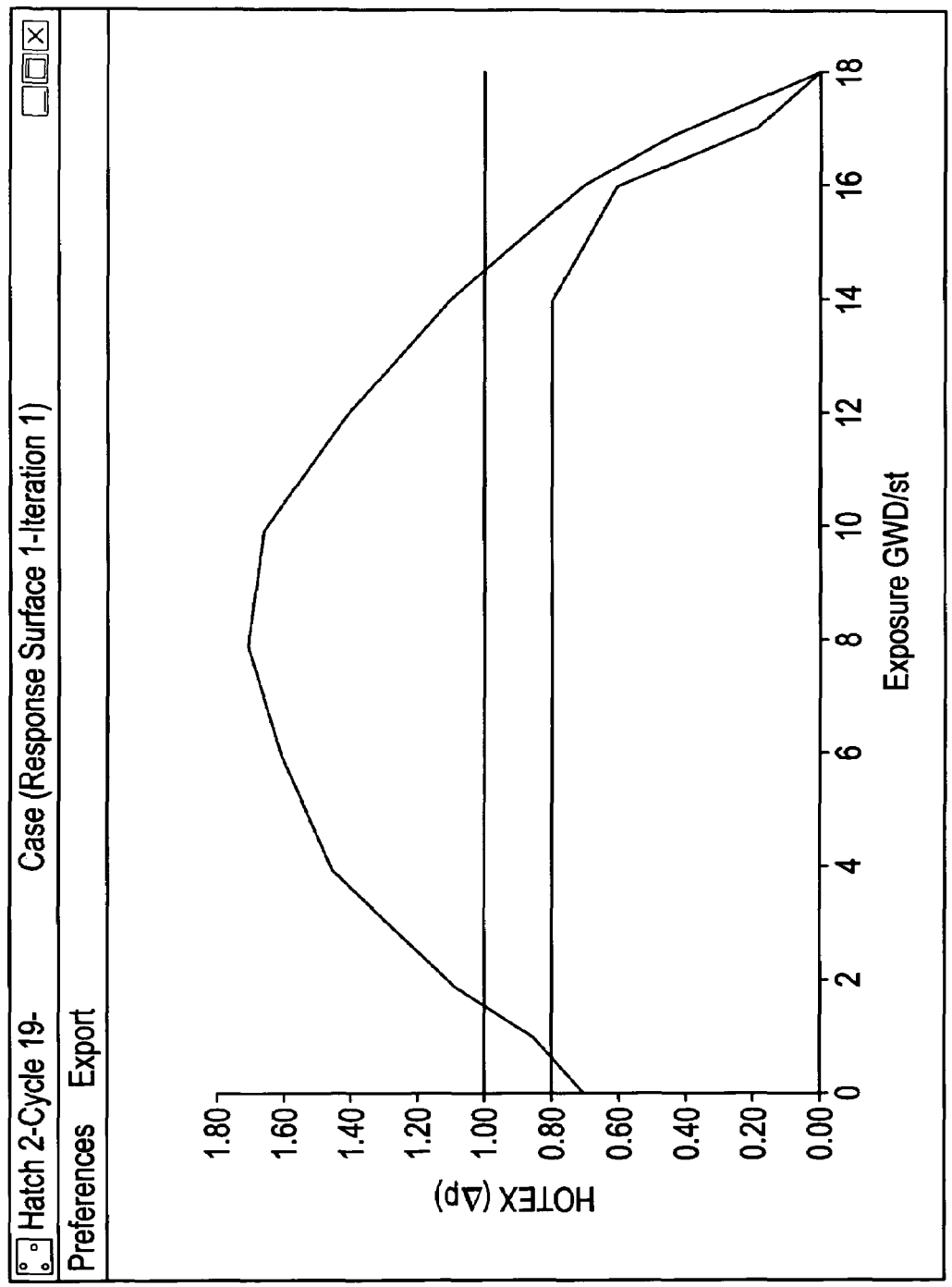
FIGS. 18 and 19 illustrate the dominant constraint for target hot-excess reactivity for a given energy cycle of a selected plant pre-optimization and post-optimization.
Figure 19:
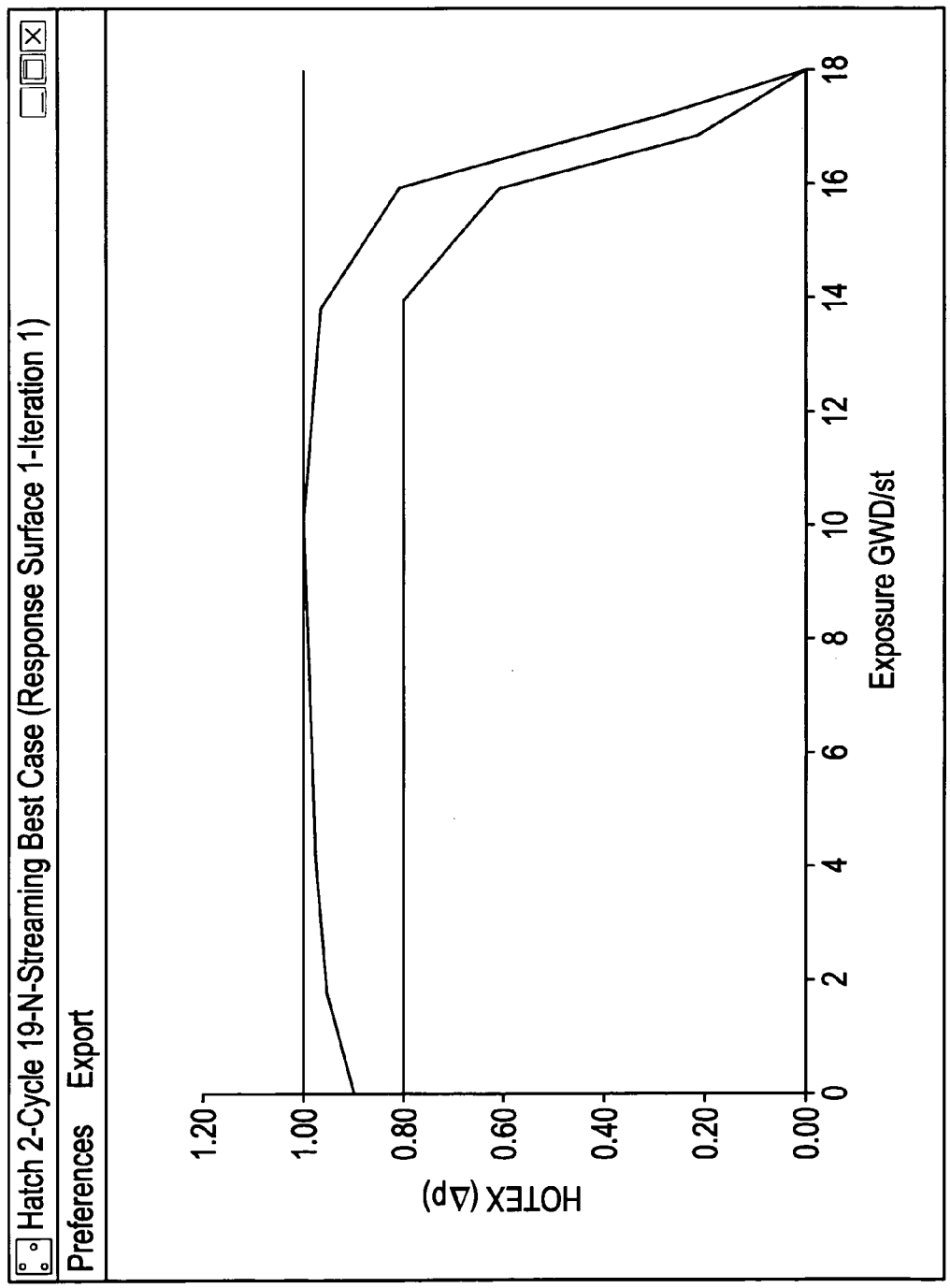

FIGS. 18 and 19 illustrate the dominant constraint for target hot-excess reactivity for a given energy cycle of a selected plant pre-optimization and post-optimization. FIGS. 18 and 19 illustrate the design problem and solution determined in accordance with the exemplary embodiments for an actual cycle of an actual plant. FIG. 18 illustrates the design problem for the designer or customer. Over the cycle, the hot-excess reactivity is below the target window at beginning of cycle (BOC), rises above the target window over several exposures, and then drops toward EOC as expected due to fuel depletion, requiring control blade notch position and/or core flow adjustments to compensate (toward EOC, the hot excess reactivity typically ramps toward zero). Note that the minimum % hot excess reactivity value of the target hot-excess reactivity window reflects the depletion of the fuel; a rapid change in hot excess reactivity is expected toward EOC, indicating a loss of full-power capability at EOC. This is why the exposure dependence block is checked for the minimum % hot excess reactivity optimization constraint 830 shown in FIG. 8.

By setting a hot excess reactivity target window as a dominant constraint and then selecting a desired minimum blade density and core flow window for the reference core design, and then optimizing a solution (accepted core design) through iterative bundle replacement, simulation and modification until convergence is achieved, the user or designer may realize a core design which satisfies the dominant constraint for the core energy cycle.

The method and arrangement of the present invention may enable the determining of types and placements of fresh fuel bundles, and the number, placement and movements of control blades within a nuclear reactor core design so as to satisfy a set of defined constraints or limits that include a target hot excess reactivity value over the energy cycle, without regard to bundle complexity or number of fresh fuel bundle designs. In contrast to current core designs, which typically utilize, at most) one or two fresh fuel types (i.e., a one or two stream solution), any number or combinations of fresh fuel bundle designs (e.g., "N streams") may be utilized in order to determine the desired fuel bundles for placement. A desired target hot excess reactivity can thus be met with a reduced number of control blades and/or with reduced blade movement over the energy cycle, while achieving N new fresh fuel bundle designs. In an example, the exemplary methodology may be used to determine a core design satisfying the target hot excess reactivity constraint with any of a 0, 1, 4, 5, 8 and/or 9-blade definition with N unique fresh fuel bundle types (N streams), where N equals or exceeds at least 2 unique fresh fuel bundle types (N≧2).

The method and arrangement offer several additional advantages, including, but not limited to: developing a core design for simpler reactor operations (less control blade movement); improved capacity factor; elimination of shadow corrosion as a channel bow mechanism; the reduction and/or elimination of needing "soft handling" for fuel stress; a reduction in outage time due to reduced control blade maintenance, and a reduction in control blade expenditures The exemplary embodiments of the present invention being thus described, it will be obvious that the same may be varied in many ways. For example, the functional blocks of FIGS. 1-7B describing the exemplary methodology and arrangement may be implemented in hardware and/or software. The hardware/software implementations may include a combination of processor(s) as shown and/or article(s) of manufacture. The article(s) of manufacture may further include storage media and executable computer program(s).

The executable computer program(s) may include the instructions to perform the described processes or functions to determine a core loading pattern design. The computer executable program(s) may also be provided as part of externally supplied propagated signal(s).

The technical effect of the invention may be an arrangement and/or method invoking the processing capabilities of multiple processors(s) and/or computer program logic of the programs implemented by the one or more processors to provide a way to efficiently develop a core design a nuclear reactor core that satisfies all input limits including dominant target hot excess reactivity constraint with a minimum blade density, as well as a computer/processing-driven arrangement for providing internal and external users the ability to quickly develop, simulate, modify and perfect a core design with a specified loading pattern for fresh fuel assemblies which satisfies all input limits including the target hot excess reactivity constraint, while achieving a desired minimum blade density. The accepted design may thus be loaded in the core of the selected reactor at a next scheduled outage, and the core operating in a next and subsequent cycles in accordance with the thus determined core design.

Such variations are not to be regarded as departure from the spirit and scope of the exemplary embodiments of the present invention, and all such modifications as would be obvious to one skilled in the art are intended to be included within the scope of the following claims.

What is claimed:

1. A method of determining a core design for a nuclear reactor, comprising:

defining a set of limits applicable to determining a core design, the set of limits including a target hot excess reactivity constraint to be satisfied over a given core energy cycle and a given desired control blade definition that is set for the core energy cycle;

generating a reference core design based on the defined limits, the reference core design including an initial loading pattern of current fresh fuel bundles arranged in a plurality of fuel locations within the reference core design and the given desired control blade definition;

selecting a unique subset of fresh fuel bundles to be evaluated in the reference core design; and performing a first iteration to determine an accepted core design;

wherein the first iteration comprises;
replacing, at each fuel location, at least one of the current fresh fuel bundles with at least one of the selected fresh fuel bundles;
simulating reactor operation on the reference core design to produce a plurality of outputs, each output corresponding to the reference core design containing one or more of the selected fresh fuel bundles; and
ranking the outputs based on the defined set of limits, the highest ranked output representing an accepted core design for the nuclear reactor that satisfies the target hot excess reactivity constraint with the given desired control blade definition.

2. The method of claim 1, further comprising:
setting the accepted core design as a new reference core design, if the highest ranked output is an improvement over the reference core design; and
performing a second iteration of replacing, simulating, and ranking to determine a revised accepted core design,
else providing data related to limits violated during the simulation, if the highest ranked output is no improvement over the reference core design.

3. The method of claim 2, wherein the highest ranked output from the second iteration represents an output that, based on the defined set of limits, shows a greatest improvement in performance as compared to the highest ranked output of the first iteration, and
wherein the performance relates to at least one or more of the defined limits.

4. The method of claim 3, further comprising:
iteratively repeating the setting, replacing, simulating, and ranking over N iterations until there is no further improvement in performance between highest ranked outputs of successive iterations;
wherein the performance relates to at least one or more of the defined limits, and
wherein the defined limits are applicable to the reference core design in each of the N iterations.

5. The method of claim 1, wherein ranking the outputs further includes:
configuring an application-specific objective function to evaluate the outputs; and
generating a figure of merit value for each output using the application-specific objective function; and
ranking the figure of merit values based on the defined limits.

6. The method of claim 1, wherein one of the defined limits is a set core flow window defining a maximum and minimum core flow for the core energy cycle.

7. The method of claim 1, wherein one of the defined limits is a set hot excess reactivity window defining a maximum and minimum hot excess reactivity value for the core energy cycle.

8. The method of claim 1, wherein the given desired control blade definition includes a set number of core blades, and
wherein the given desired control blade definition includes a window representing a maximum and minimum notch position of the set number of core blades for the core energy cycle.

9. The method of claim 1, wherein the accepted core design has a control blade definition selected from a group comprising a 0-control blade definition, 1-control blade definition, 4-control blade definition, 5-control blade definition, 8-control blade definition, and 9-control blade definition.

10. The method of claim 1, wherein the accepted core design has N unique fresh fuel bundle types, $N \geq 2$.

11. An arrangement for determining a core design for a nuclear reactor, comprising:
a memory for storing a plurality of fresh fuel bundles to be evaluated in a reference core design;
an interface for receiving a set of limits applicable to the reference core design, and for selecting a unique subset of fresh fuel bundles from the bundles stored in memory to be evaluated in the reference core design, wherein the set of limits include a target hot excess reactivity constraint to be satisfied over a given core energy cycle and a given desired control blade definition for the reference core design that is set for the core energy cycle; and
a processor arrangement for generating the reference core design based on the received limits, the reference core design including an initial loading pattern of current fresh fuel bundles arranged in a plurality of fuel locations within the reference core design and the given desired control blade definition;
wherein the processor arrangement is configured to implement:
a replacing function to replace, at each fuel location, at least one of the current fresh fuel bundles with at least one of the selected fresh fuel bundles;
a simulating function to direct simulation of reactor operation on the reference core design to produce a plurality of outputs, each output corresponding to the reference core design containing one or more of the selected fresh fuel bundles; and
a ranking function to rank the outputs based on the defined set of limits, the highest ranked output representing an accepted core design for the nuclear reactor that satisfies the target hot excess reactivity constraint with the set control blade definition.

12. The arrangement of claim 11, wherein the memory further stores an application-specific objective function based on a generic objective function definition that is a sum of a first number of credit terms plus a sum of a second number of penalty terms,
wherein the set of limits received by the interface includes credit term variables related to credit terms of the application-specific objective function and penalty term variables related to penalty terms of the application specific objective function, and
wherein the processor arrangement, based on the credit term variables and penalty term variables, evaluates the outputs using the application-specific objective function to generate a figure of merit value for each output that is used to rank the outputs.

13. The arrangement of claim 12, wherein the set of limits are received from one of a user or a simulator.

14. The arrangement of claim 11, wherein the interface is a graphical user interface adapted for communication with a user over one of an internet or intranet.

15. The arrangement of claim 11, wherein the replacing, simulating, and ranking functions represent a first iteration,
wherein the interface receives commands to modify the accepted core design, and
wherein the processor arrangement performs a second iteration of replacing, simulating, and ranking functions to determine a refined core design.

16. The arrangement of claim 15, wherein the memory iteratively stores each modified accepted core design,
wherein the processor sets an accepted core design from a previous iteration as the reference core design for a current iteration and iteratively repeats, for N iterations, the setting, replacing, simulating, and ranking functions until there is no further improvement in performance between highest ranked outputs of successive iterations, and wherein the interface outputting data related to a final, acceptable core design to the user.

17. The arrangement of claim 11, wherein the accepted core design has a control blade definition selected from a group comprising a 0-control blade definition, 1-control blade definition, 4-control blade definition, 5-control blade definition, 8-control blade, definition and 9-control blade definition.

18. The arrangement of claim 11, wherein the accepted core design has N unique fresh fuel bundle types, $N \geq 2$.

* * * * *